United States Patent
Park et al.

(10) Patent No.: US 11,837,118 B2
(45) Date of Patent: Dec. 5, 2023

(54) DISPLAY DEVICE

(71) Applicant: Samsung Display Co., Ltd., Yongin-si (KR)

(72) Inventors: Dong Jin Park, Seongnam-si (KR); Dong Woo Seo, Suwon-si (KR); Jai Ku Shin, Hwaseong-si (KR); Sung Chul Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/780,705

(22) Filed: Feb. 3, 2020

(65) Prior Publication Data

US 2020/0380893 A1 Dec. 3, 2020

(30) Foreign Application Priority Data

May 31, 2019 (KR) .................. 10-2019-0064591

(51) Int. Cl.
| | | |
|---|---|---|
| *G06F 1/16* | (2006.01) | |
| *G09F 9/30* | (2006.01) | |
| *G02F 1/1333* | (2006.01) | |
| *G06F 3/041* | (2006.01) | |
| *H04M 1/02* | (2006.01) | |

(52) U.S. Cl.
CPC ........ *G09F 9/301* (2013.01); *G02F 1/133305* (2013.01); *G06F 1/1652* (2013.01); *G06F 3/041* (2013.01); *H04M 1/0268* (2013.01); *G06F 2203/04102* (2013.01)

(58) Field of Classification Search
CPC .. G09F 9/301; G02F 1/133305; G06F 1/1652; G06F 3/041; G06F 2203/04102
See application file for complete search history.

(56) References Cited

U.S. PATENT DOCUMENTS

| | | | |
|---|---|---|---|
| 9,986,144 B2* | 5/2018 | Tuulos ............... | H04N 5/23296 |
| 10,504,971 B2* | 12/2019 | Yang ...................... | G06F 3/0446 |
| 10,770,517 B2* | 9/2020 | Bok ...................... | H01L 51/0097 |
| 2016/0202515 A1* | 7/2016 | Watanabe ............ | G02F 1/1339 |
| | | | 349/190 |
| 2017/0262026 A1* | 9/2017 | Jin .......................... | G01S 17/08 |
| 2017/0287992 A1* | 10/2017 | Kwak .................... | G06F 1/1652 |
| 2017/0353643 A1* | 12/2017 | Tuulos .................. | G03B 17/00 |
| 2018/0033832 A1* | 2/2018 | Park ...................... | G06F 3/0446 |
| 2018/0069053 A1* | 3/2018 | Bok ...................... | H01L 51/5218 |
| 2018/0255219 A1* | 9/2018 | Ramaprakash ...... | G02B 26/007 |
| 2019/0064960 A1* | 2/2019 | Na ........................ | G06F 3/0412 |
| 2019/0340959 A1* | 11/2019 | Park .................... | H01L 27/3211 |

(Continued)

FOREIGN PATENT DOCUMENTS

| | | |
|---|---|---|
| KR | 10-2013-0132679 A | 12/2013 |
| KR | 10-2018-0005476 A | 1/2018 |
| KR | 10-2018-0114565 A | 10/2018 |

*Primary Examiner* — Abhishek M Rathod
*Assistant Examiner* — Keith DePew
(74) *Attorney, Agent, or Firm* — Lewis Roca Rothgerber Christie LLP

(57) ABSTRACT

In a display device including a display panel, the display device includes: an active region; a plurality of hole areas at least partially surrounded by the active region; and a folding line extending in one direction, wherein each of the hole areas includes at least one hole, and wherein the holes of each hole area are arranged in an extending direction of the folding line.

23 Claims, 23 Drawing Sheets

(56) References Cited

U.S. PATENT DOCUMENTS

| | | | | |
|---|---|---|---|---|
| 2019/0357366 A1* | 11/2019 | Choi | ................... | B32B 15/18 |
| 2019/0363266 A1* | 11/2019 | Tanaka | ................... | H05B 33/06 |
| 2020/0110495 A1* | 4/2020 | Han | ................... | G06F 3/0443 |
| 2020/0110525 A1* | 4/2020 | Park | ................... | H01L 27/3244 |
| 2020/0124910 A1* | 4/2020 | Hwang | ................... | G02F 1/136209 |
| 2020/0168671 A1* | 5/2020 | Jang | ................... | H01L 27/3276 |
| 2020/0328375 A1* | 10/2020 | Won | ................... | H01L 51/0097 |
| 2020/0342806 A1* | 10/2020 | Kim | ................... | G06F 3/0443 |
| 2021/0135151 A1* | 5/2021 | Baek | ................... | H01L 51/5237 |

* cited by examiner

Fig. 3
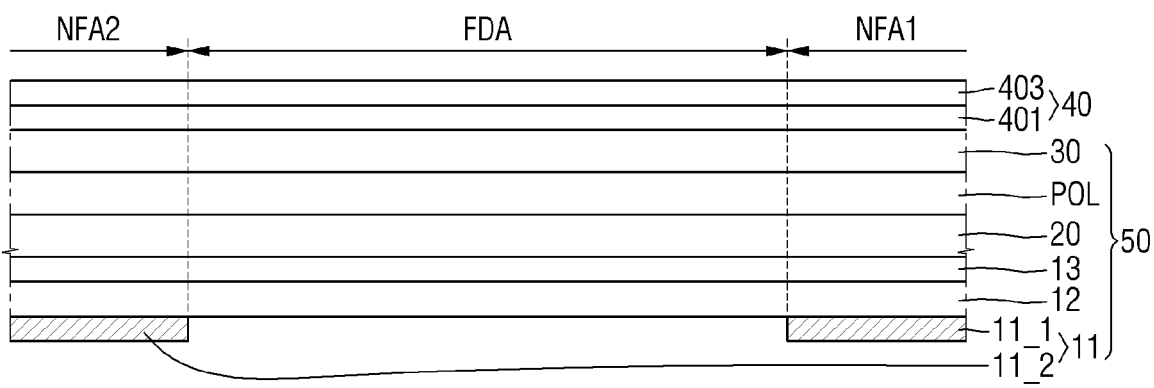
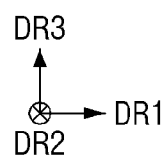

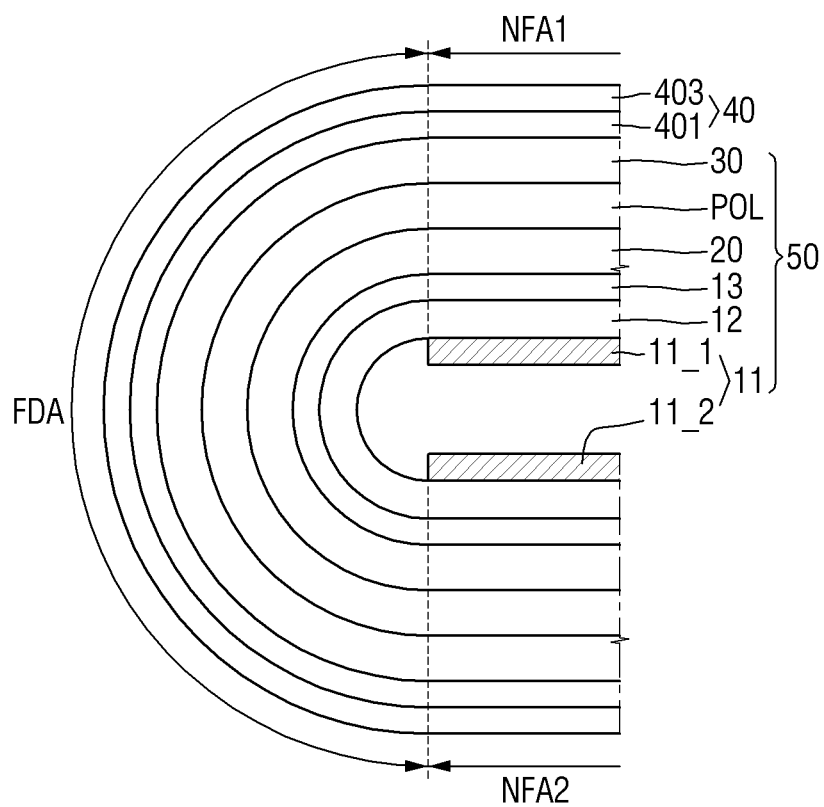
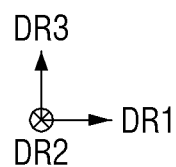
Fig. 4

Fig. 5
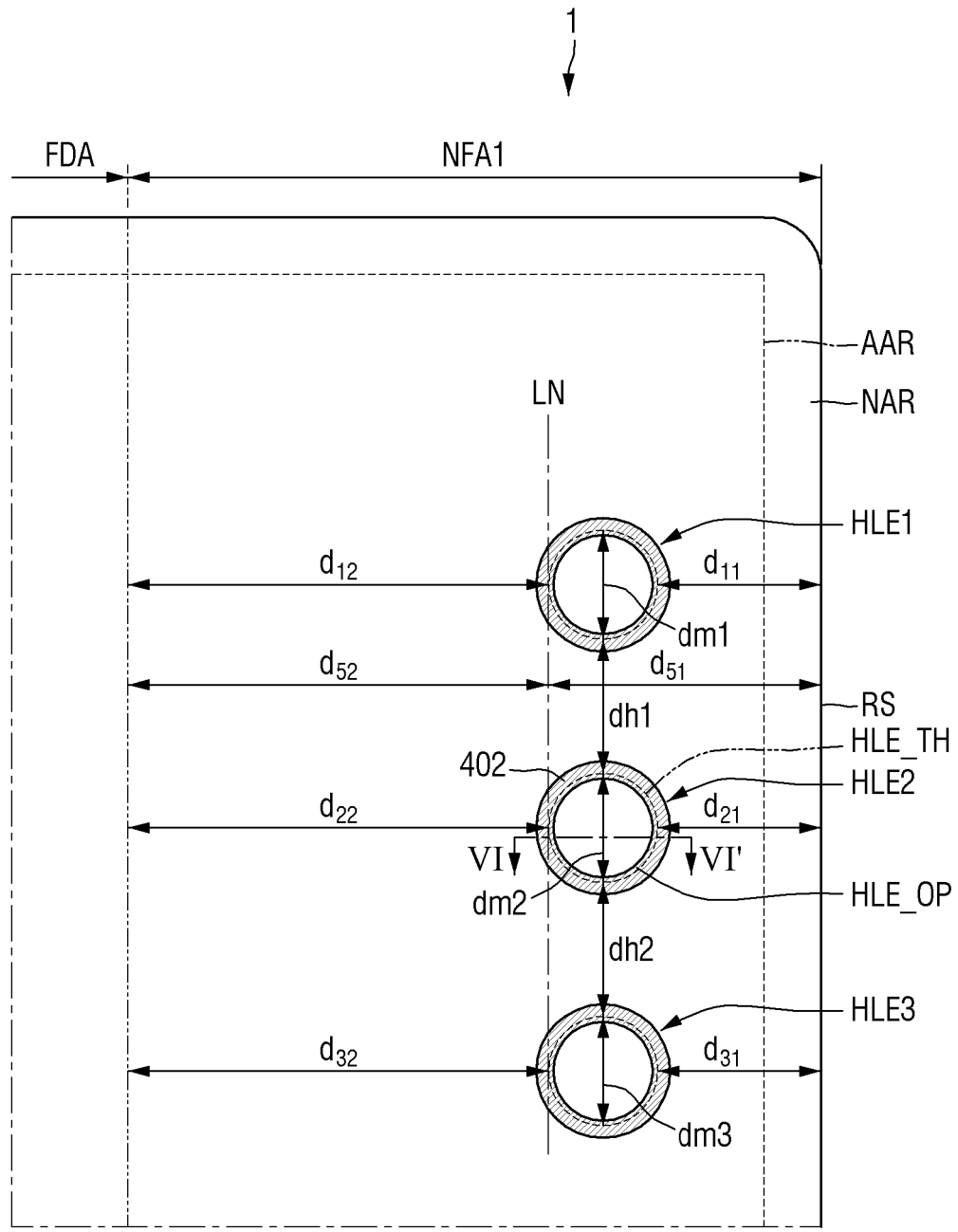
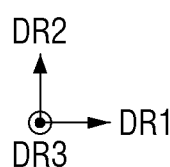

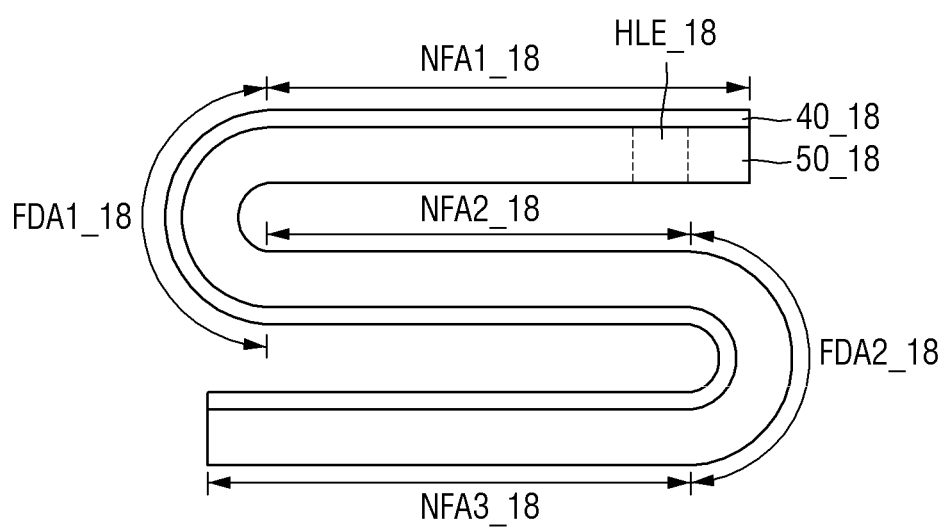
Fig. 19
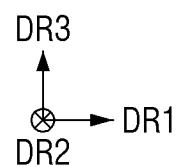

DISPLAY DEVICE

CROSS-REFERENCE TO RELATED APPLICATION

The present application claims priority to and the benefit of Korean Patent Application No. 10-2019-0064591 filed on May 31, 2019 in the Korean Intellectual Property Office, the content of which is incorporated herein by reference in its entirety.

BACKGROUND

1. Field

Aspects of some example embodiments of the present disclosure relate to a display device.

2. Description of the Related Art

Electronic apparatuses providing images to users, such as smartphones, tablet PCs, digital cameras, laptop computers, navigation devices, and smart televisions, include display devices for displaying images.

Recently, optical elements such as cameras and infrared sensors have been mounted on display devices in order to implement various functions other than screen display. The display devices may include optical holes in order for the optical elements to receive light. Some members of the display devices may be physically perforated to increase the transmittance of the optical holes.

Further, recently, foldable display devices have attracted much attention. Because foldable display devices may have a relatively wide screen with relatively good portability, they may have characteristics of both a smartphone and a tablet PC. A folding operation of foldable display devices may apply stress to each layer constituting the display device. If the optical holes undergo such stress, inter-component interference, cracks in a thin film encapsulation layer protecting a light emitting element, peeling of a polarizing member, and the like may occur.

The above information disclosed in this Background section is only for enhancement of understanding of the background and therefore the information discussed in this Background section does not necessarily constitute prior art.

SUMMARY

Aspects of some example embodiments of the present disclosure may include a foldable display device capable of preventing or reducing inter-component interference, cracks in a thin film encapsulation layer protecting a light emitting element, peeling of a polarizing member, and the like due to a folding operation in an active region.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some example embodiments of the present disclosure, in a display device including a display panel, the display device includes an active region, a plurality of hole areas which are at least partially surrounded by the active region and a folding line extending in one direction, wherein each of the hole areas includes at least one hole, and wherein the holes of each hole area are arranged in an extending direction of the folding line.

According to some example embodiments, in a foldable display device including a plurality of stacked layers, the foldable display device includes a folding line extending in one direction, a first unfolding area on one side of the folding line, a second unfolding area on the other side of the folding line and a through hole in the first unfolding area and passing through at least a portion of the plurality of layers in a thickness direction, wherein the through hole is inside an active region of the display device, wherein a first distance between one edge of the first unfolding area and the through hole is smaller than a second distance between the folding line and the through hole, wherein the first distance is 10 mm or less and wherein a diameter of the through hole is 4.0 mm or less.

According to some example embodiments of the present disclosure, a display device is configured such that a through hole is located away from a folding line. Thus, it may be possible to prevent or reduce inter-component interference, cracks in a thin film encapsulation layer protecting a light emitting element, peeling of a polarizing member and the like due to a folding operation. Therefore, an optical element can be smoothly operated regardless of whether or not the display device is folded, and a stacked structure and stacked members of the display device can be maintained.

The characteristics of the present disclosure are not limited to the above-described characteristics and other aspects which are not described herein will become apparent to those skilled in the art from the following description.

BRIEF DESCRIPTION OF THE DRAWINGS

The above and other aspects and characteristics of example embodiments according to the present disclosure will become more apparent by describing in more detail aspects of some example embodiments with reference to the attached drawings, in which:

FIG. 3 is a cross-sectional view of a display device in an unfolded state according to some example embodiments;

FIG. 4 is a cross-sectional view of a display device in an out-folded state according to some example embodiments;

FIG. 5 is a layout diagram showing a planar arrangement relationship between members around a plurality of hole areas;

FIG. 19 is a side view showing the display device of FIG. 18 in a folded state;

DETAILED DESCRIPTION

Aspects of some example embodiments of the present invention will now be described more fully hereinafter with reference to the accompanying drawings, in which some example embodiments of the invention are shown. The present invention may, however, be embodied in different forms and should not be construed as limited to the embodiments set forth herein. Rather, these embodiments are provided so that this disclosure will be more thorough and more complete, and will more fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In concluding the detailed description, those skilled in the art will appreciate that many variations and modifications can be made to the example embodiments without substantially departing from the principles of the present invention. Therefore, the disclosed example embodiments of the invention are used in a generic and descriptive sense only and not for purposes of limitation.

Hereinafter, aspects of some example embodiments will be described in more detail with reference to the accompanying drawings.

Figure 1:
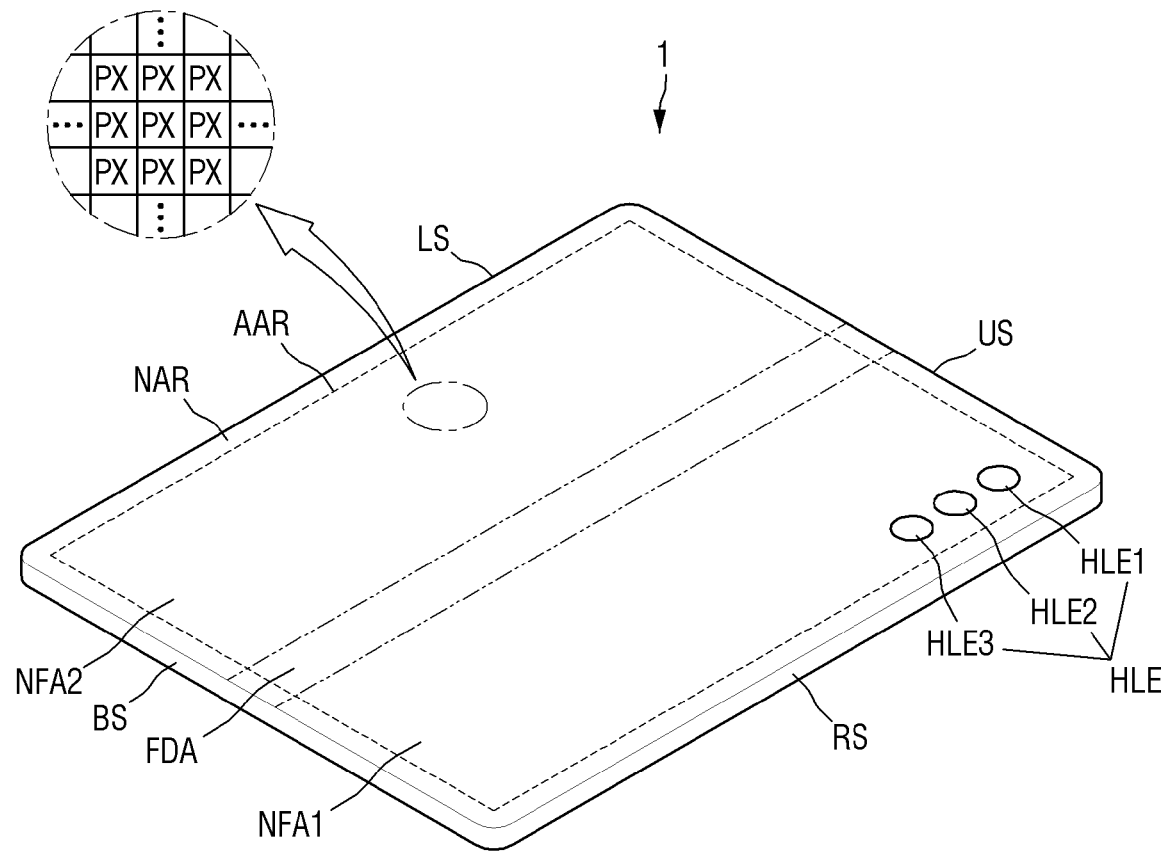
FIG. 1 is a perspective view of a display device according to some example embodiments.
Figure 2:
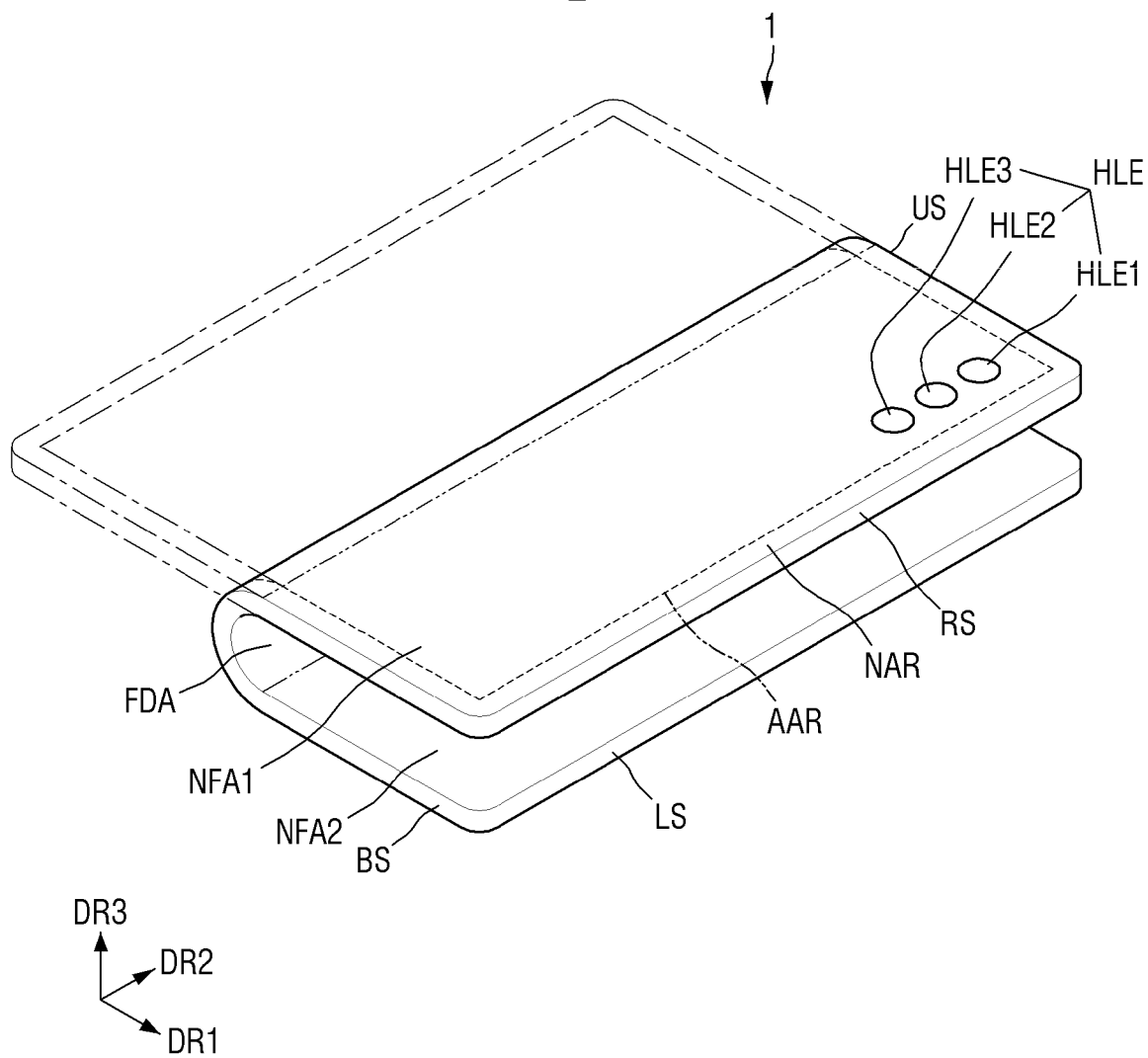
FIG. 2 is a perspective view showing an out-folded state of the display device of FIG. 1 in the embodiment.

FIG. 1 is a perspective view of a display device according to some example embodiments. FIG. 2 is a perspective view showing an out-folded state of the display device of FIG. 1 according to some example embodiments.

In the drawings, a first direction DR1 indicates a horizontal direction of a display device 1 in a plan view, and a second direction DR2 indicates a vertical direction of the display device 1 in a plan view. Further, a thickness direction (third direction) indicates a thickness direction of the display device 1. The first direction DR1 and the second direction DR2 perpendicularly intersect each other. The thickness direction (third direction) is a direction intersecting the plane on which the first direction DR1 and the second direction DR2 are located, and perpendicularly intersects both the first direction DR1 and the second direction DR2. In the embodiments, one side of the first direction DR1 represents a direction toward the right side in a plan view, and the other side of the first direction DR1 represents a direction toward the left side in a plan view. One side of the second direction DR2 represents an upward direction in a plan view, and the other side of the second direction DR2 represents a downward direction in a plan view. One side of the thickness direction (third direction) represents an upward direction in cross-sectional view, and the other side of the thickness direction (third direction) represents a downward direction in cross-sectional view. Therefore, in the plan view of the display device 1, a side located on one side of the first direction DR1 is defined as a right side RS, and a side located on the other side of the first direction DR1 is defined as a left side LS. Further, a side located on one side of the second direction DR2 is defined as an upper side US, and a side located on the other side of the second direction DR2 is defined as a lower side BS. It should be understood, however, that a direction mentioned in the embodiment refers to a relative direction and the embodiments are not limited to the direction mentioned.

The display device 1 displays a screen or an image through an active region AAR to be described later, and various devices including the active region AAR may be included therein. Examples of the display device 1 may include, but are not limited to, a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various household appliances such as a refrigerator and a washing machine including the active region AAR, an Internet-of-Things device, and the like.

The display device 1 may have a rectangular or square shape in a plan view. The display device 1 may have a rectangular shape with right-angled or rounded corners in a plan view. The display device 1 may include two short sides arranged in the horizontal direction (first direction DR1) and two long sides arranged in the vertical direction (second direction DR2).

The display device 1 includes an active region AAR and a non-active region NAR. The active region AAR of the display device 1 may include a display area. Further, when the display device 1 has a touch function, a touch area, which is an area where a touch input is sensed, may also be included in the active region AAR.

The shape of the active region AAR may correspond to the shape of the display device 1 to which the active region AAR is applied. For example, when the display device 1 is rectangular in a plan view, the shape of the active region AAR may also be rectangular.

The active region AAR may include a plurality of pixels PX. The plurality of pixels PX may be arranged in a matrix. The shape of each pixel PX may be a rectangular or square shape in a plan view. However, embodiments according to the present disclosure are not limited thereto, and it may be a rhombic shape in which each side is inclined with respect to the second direction DR2.

The non-active region NAR may surround the periphery of the active region AAR. The non-active region NAR may include a non-display area where no display is performed. The non-active region NAR may surround all sides of the active region AAR, but embodiments according to the present disclosure are not limited thereto. The non-active region NAR may not be located in the vicinity of at least a portion of the four sides of the active region AAR. A bezel region of the display device 1 may be configured as the non-active region NAR. A print layer ('402' in FIG. 6) of a window member ('40' in FIG. 6), which will be described later may be overlappingly located on the non-active region NAR.

The display device 1 may include a hole area HLA including at least one hole HLE. The hole area HLA is arranged to overlap an optical element ('OPS' in FIG. 6) in the thickness direction (third direction DR3) to transmit light to a light receiving portion of the optical element. The hole area HLA may be located inside the active region AAR. The hole area HLA may be at least partially surrounded by the active region AAR. Although it is illustrated in the drawing that the active region AAR completely surrounds the periphery of the hole area HLA, a portion of the hole area HLA may be connected to the non-active region NAR located in the periphery (or edges) of the active region AAR. However, embodiments according to the present disclosure are not limited thereto, the hole area HLA may correspond to the non-active region NAR where no display is performed. According to some example embodiments, the hole area HLA may be the active region AAR which itself displays a screen.

The hole area HLA of the display device 1 may be provided plurally. The hole areas HLA may be spaced apart from each other. The arrangement of the hole areas HLA in the display device 1 is associated with a slip amount, interference with the optical element, cracking of a thin film encapsulation layer ('290' in FIG. 10), the possibility of peeling of a polarizing member ('POL' in FIG. 3) and the like. A more detailed description thereof will be given later.

The display device 1 may be a foldable display device. As used herein, the term "foldable display device" refers to a display device which can be folded and may have both a folded state and an unfolded state. Further, the folding may include folding at an angle of about 280 degrees. However, embodiments according to the present disclosure are not limited thereto, and it may include a case where the folding angle exceeds 280 degrees or is less than 280 degrees, for example, a case where the folding angle is above 90 degrees or less than 280 degrees, or a case where the folding angle is above 220 degrees or less than 280 degrees. In addition, it may be referred to as a folded state if folding is performed out of the unfolded state, even if complete folding is not performed. For example, even if it is folded at an angle of 90 degrees or less, as long as the maximum folding angle becomes 90 degrees or more, it may be expressed as being in a folded state to distinguish it from the unfolded state.

The display device 1 may include a folding line FDA (or folding area). The display device 1 may be folded with respect to the folding line FDA. The folding may be classified into in-folding in which the display surface of the display device 1 is folded inward and out-folding in which the display surface of the display device 1 is folded outward. Although FIG. 2 illustrates that the display device 1 is out-folded, embodiments according to the present disclosure are not limited thereto. The display device 1 may be folded in an in-folding manner. In addition, the display device 1 may be folded in an out-folding manner or in-folding manner, or both out-folding and in-folding may be performed. In the case of a display device in which both out-folding and in-folding are performed, out-folding and in-folding may be performed with respect to the same folding line FDA. Alternatively, it may include a plurality of folding lines FDA, such as a folding line FDA for out-folding only and a line FDA for in-folding only, which are used to perform different types of folding.

The folding line FDA may have an extending direction parallel to one side of the display device 1. For example, the folding line FDA may extend in the same direction (second direction DR2 in FIG. 1) as the vertical direction of the display device 1. In the display device 1 having a rectangular shape in which a length in the vertical direction is longer than that in the horizontal direction as shown in the figure, when it has the folding line FDA extending in the vertical direction, the long side of the display device 1 may be maintained in the same way before and after folding, but the short side may be reduced to half or less. According to some example embodiments, the folding line FDA may extend in the same direction as an extending direction of the short side. In this case, the long side and the short side may be maintained, or may be changed before and after folding.

The folding line FDA may also have a predetermined width in the first direction DR1. The width of the folding line FDA in the first direction DR1 may be much smaller than the width in the second direction DR2.

The display device 1 may include an unfolding area NFA located around the folding line FDA. The unfolding area NFA may include a first unfolding area NFA1 located on one side of the folding line FDA in the first direction DR1 and a second unfolding area NFA2 located on the other side of the folding line FDA in the first direction DR1. The widths of the first unfolding area NFA1 and the second unfolding area NFA2 in the first direction DR1 may be equal to each other, but embodiments according to the present disclosure are not limited thereto. The width of the first unfolding area NFA1 and the width of the second unfolding area NFA2 may be different from each other according to the position of the folding line FDA.

According to some example embodiments, the display device 1 may include a display panel 20, a layer, a panel and a substrate stacked thereon, which have a flexible property, and the display device 1 may be folded by folding all the members. In some embodiments, at least a portion of the display panel 20 or the members stacked thereon may have a separate shape with respect to the folding line FDA. In this case, the separated member located in the unfolding area NFA may not have a flexible property.

The active region AAR/non-active region NAR and the folding line FDA/non-folding area NFA of the display device 1 described above may overlap each other at the same position. For example, a specific position may be located in the active region AAR and also located in the first unfolding area NFA1. Another specific location may be located in the non-active region NAR and also located in the first unfolding area NFA1. Still another specific position may be located in the active region AAR and also located in a region including the folding line FDA.

According to some example embodiments, the active region AAR of the display device 1 may be located over both the first unfolding area NFA1 and the second unfolding area NFA2. Further, the active region AAR may be located even in the folding line FDA corresponding to a boundary between the first unfolding area NFA1 and the second unfolding area NFA2. That is, the active region AAR of the display device 1 may be continuously arranged irrespective of boundaries of the unfolding area NFA, the folding line FDA and the like. However, embodiments according to the present disclosure are not limited thereto. The active region AAR may be located in only one of the first unfolding area NFA1 and the second unfolding area NFA2. The active region AAR may be located in the first unfolding area NFA1 and the second unfolding area NFA2, but the active region AAR may not be located in the folding line FDA.

The hole area HLA may be located in the first unfolding area NFA1 or the second unfolding area NFA2. The hole area HLA is spaced apart from the folding line FDA. When there are a plurality of hole areas HLA, all the hole areas HLA may be located in any one of the first unfolding area NFA1 and the second unfolding area NFA2, but embodiments according to the present disclosure are not limited thereto.

Hereinafter, the cross-sectional structure of the above-described display device 1 will be described.

FIG. 3 is a cross-sectional view of a display device in an unfolded state according to some example embodiments. FIG. 4 is a cross-sectional view of a display device in an out-folded state according to some example embodiments.

Referring to FIGS. 3 and 4, the display device 1 may include a display panel 20, a polarizing member POL and a window member 40 sequentially stacked on one side in the thickness direction (third direction DR3) of the display panel 20, and a polymer film layer 13, a cushion layer 12 and a metal plate 11 sequentially stacked on the other side in the thickness direction (third direction DR3) of the display panel 20.

At least one coupling member such as an adhesive layer or a tackifying layer may be located between the stacked members to couple the adjacent stacked members. However, embodiments according to the present disclosure are not limited thereto, and another layer may be further located between the respective layers, and some of the stacked members may be omitted.

The display panel 20 is a panel for displaying a screen or an image. Examples of the display panel may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel and a cathode ray tube (CRT) display panel, but also a light receiving display panel such as a liquid crystal display (LCD) panel and an electrophoretic display (EPD) panel. Hereinafter, the organic light emitting display panel will be described as an example of the display panel 20, and the organic light emitting display panel applied to the embodiment will be simply referred to as a display panel 20 unless special distinction is required. However, the embodiment is not limited to the organic light emitting display panel, and other display panels mentioned above or known in the art may be applied within the scope of the same technical ideas. A detailed structure of the display panel 20 will be described later.

The polarizing member POL may be located on the display panel 20. The polarizing member POL polarizes the light passing through it. The polarizing member POL may serve to reduce the reflection of external light.

A shock absorbing layer 30 may be located on the polarizing member POL. The shock absorbing layer 30 may serve to increase the durability of the window member 40 and improve the optical performance. The shock absorbing layer 30 may be omitted.

The window member 40 may be located on the shock absorbing layer 30. The window member 40 serves to cover and protect the display panel 20. The window member 40 may include a window substrate 401 and a protective film 403.

The window substrate 401 may be made of a transparent material. The window substrate 401 may be made of, for example, glass or plastic. When the window substrate 401 includes glass, the glass may be ultra thin glass (UTG) to thin glass. When the window substrate 401 includes plastic, the plastic may be transparent polyimide or the like, but is not limited thereto.

The protective film 403 may be located on the window substrate 401. The protective film 403 may perform at least one of functions of prevention of scattering, shock absorption, prevention of scratch, prevention of fingerprint smudges and prevention of glare on the window substrate 401. The protective film 403 may be omitted.

The polymer film layer 13 may be located below the display panel 20. The polymer film layer 13 may be formed of a material such as polyimide (PI), polyethylene terephthalate (PET), polycarbonate (PC), polyethylene (PE), polypropylene (PP), polysulfone (PSF), polymethylmethacrylate (PMMA), triacetylcellulose (TAC), cycloolefin polymer (COP) and the like.

The cushion layer 12 may be located below the polymer film layer 13. The cushion layer 12 may serve to increase the durability against a shock that may be applied in the thickness direction (third direction DR3) of the display device 1, and to relieve a drop shock of the display device 1 when the display device 1 is dropped. The cushion layer 12 may include polyurethane or the like.

The metal plate 11 may be located below the polymer film layer 13. The metal plate 11 may include a metal having excellent thermal conductivity, such as copper, silver, or the like.

In order to facilitate the folding of the display device 1, some layers of the display device 1 may be separated by the folding line FDA. For example, the metal plate 11 constituting the lowermost layer of the display device 1 and having low ductility may be separated by the folding line FDA. According to some example embodiments, the metal plate 11 may include a first metal plate 11_1 located in the first unfolding area NFA1 and a second metal plate 11_2 located in the second unfolding area NFA2. In the unfolded state, the first metal plate 11_1 and the second metal plate 11_2 may be spaced apart from each other. In the unfolded state, each of the first metal plate 11_1 and the second metal plate 11_2 may not overlap the folding line FDA, but embodiments according to the present disclosure are not limited thereto.

The cushion layer 12 or the polymer film layer 13 may also be separated by the folding line FDA. However, if it has sufficient ductility, it may have an integrally connected shape regardless of the folding line FDA and the unfolding area NFA.

When the display device 1 is out-folded with respect to the folding line FDA, the second unfolding area NFA2 may overlap the first unfolding area NFA1 in the thickness direction as shown in FIG. 4. Unlike the separated metal plate 11, the display panel 20, the polymer film layer 13, the cushion layer 12, the polarizing member POL, the window member 40 and the like, which are connected regardless of the folding line FDA, may be bent into a curved shape in cross-sectional view along the width direction of the folding line FDA. Stress may be applied to each layer when the layer is bent by the folding operation. When the magnitude of the stress applied to each layer is different, a slip phenomenon may occur in which adjacent layers in the hole HLE of the hole area HLA are not aligned in the vertical direction. Interference with components in the hole HLE, cracking of the thin film encapsulation layer which protects the light emitting element, and/or peeling of the polarizing member POL may occur according to a slip amount ('SL' in FIG. 7) generated in the hole HLE of the hole area HLA. The slip amount of the hole HLE may vary depending on the position of the hole HLE. By controlling the position of the hole area HLA, an interval, a hole diameter dm and the like, it is possible to reduce cracks in the thin film encapsulation layer protecting the light emitting element and poor peeling of the polarizing member POL. Hereinafter, the control of the slip amount according to the hole area HLA and its position will be described in detail.

Figure 6:
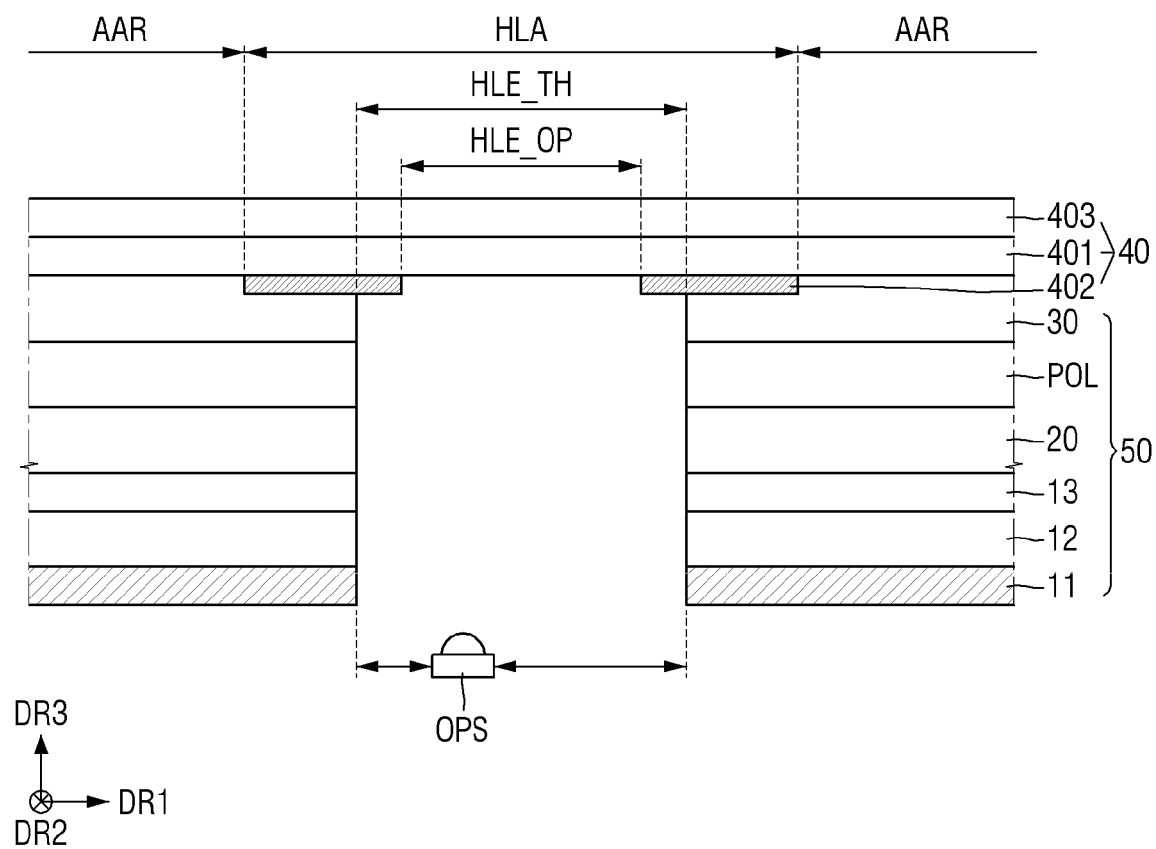
FIG. 6 is a cross-sectional view taken along the line VI-VI' of FIG. 5.
Figure 7:
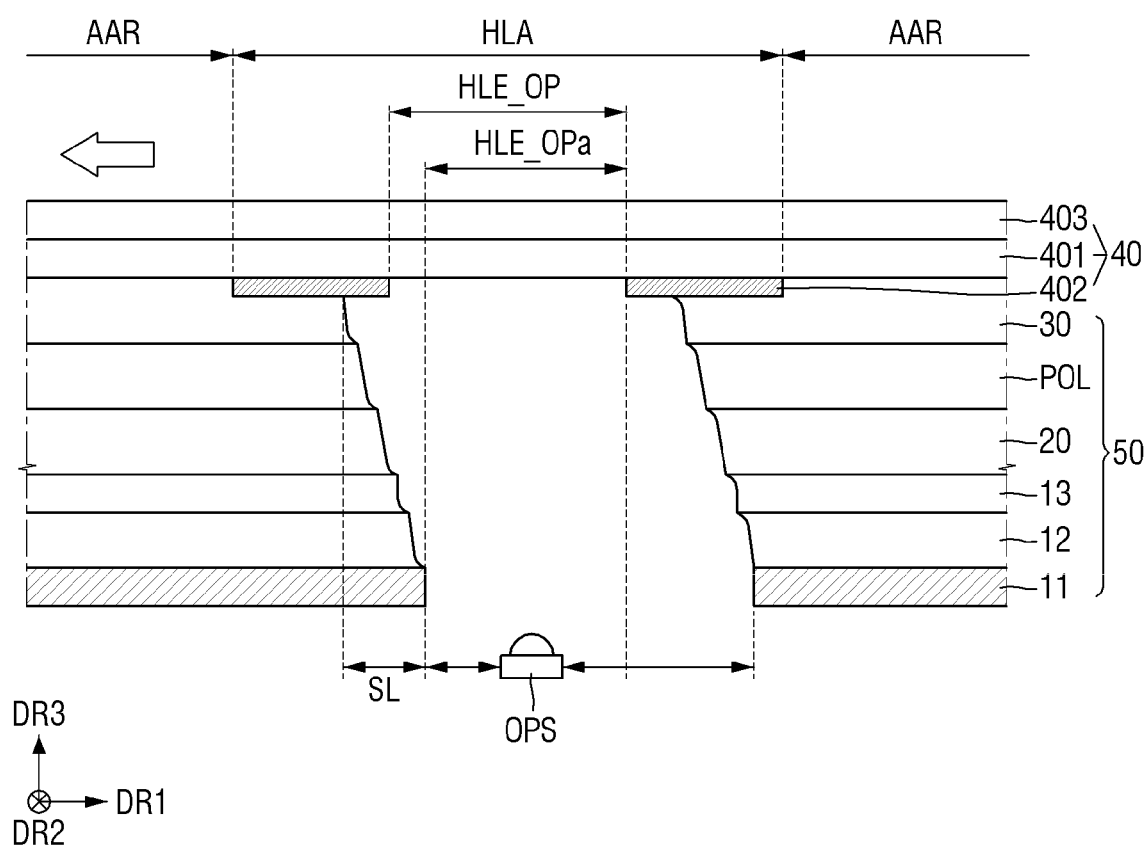
FIG. 7 is a cross-sectional view showing the display device of FIG. 6 in a folded state.

FIG. 5 is a layout diagram showing a planar arrangement relationship between members around a plurality of hole areas. FIG. 6 is a cross-sectional view taken along line VI-VI' of FIG. 5. FIG. 7 is a cross-sectional view showing the display device of FIG. 6 in a folded state. For convenience of explanation, in FIGS. 6 and 7, the sizes of an optical element OPS, a through hole HLE_TH, an optical hole HLE_OP and an effective optical hole HLE_OPa, moving distances of the stacked members according to folding of the display device 1 and the like are shown in exaggerated proportions. This is to clarify the position of the optical element OPS and the movement of the stacked members during the folding, and a ratio of the actual sizes of the respective members, and the lengths of movement of the stacked members as the display device is folded may be different.

First, referring to FIGS. 5 and 6, the hole area HLA may include at least one hole HLE and its peripheral area. A print layer 402 of the window member 40, a dam structure ('DAM' of FIG. 10) of the display panel 20 and the like may be located in the peripheral area of the hole HLE.

The hole area HLA may have a shape such as a circle, or an ellipse, a dumbbell and a rectangle with convex short sides in plan view. However, embodiments according to the present disclosure are not limited thereto, and various modifications such as a rectangle, a square, and other polygons are possible. The hole HLE of the hole area HLA may also have a circular shape, an elliptical shape or the like in plan view.

The hole HLE may include a physical through hole HLE_TH. The through hole HLE_TH may be a hole physically passing through the metal plate 11, the cushion layer 12, the polymer film layer 13, the display panel 20, the polarizing member POL and the shock absorbing layer 30. A stacked structure 50 constituting the through hole HLE_TH may include the polarizing member POL, the display panel 20, the polymer film layer 13, the cushion layer 12 and the metal plate 11. As the above-mentioned layers are removed through the through hole HLE_TH, the light transmittance in the corresponding region can be improved.

Meanwhile, in a region overlapping the through hole HLE_TH, the hole may not physically pass through the window member 40. Because the window substrate 401 of the window member 40 itself has high light transmittance, the high light transmittance can be maintained even if it does not physically pass therethrough. In addition, it is possible to protect the members below the window member 40 as the window member 40 physically covers them without perforation in the corresponding region.

The hole area HLA may further include the optical hole HLE_OP which is an optical light transmitting window in addition to the through hole HLE_TH. The optical hole HLE_OP may overlap the through hole HLE_TH and may be defined by a pattern of the print layer 402 of the window member 40. The print layer 402 may be located on one surface and/or the other surface of the window substrate 401. The print layer 402 may be located partially in the hole area HLA to prevent light from being emitted through the through hole HLE_TH (e.g., light leakage phenomenon). The print layer 402 of the hole area HLA may partially overlap the through hole HLE_TH. That is, the inner surface of the print layer 402 may further protrude inward from the inner wall of the through hole HLE_TH. The print layer 402 may be arranged to extend up to the outer periphery of the hole area HLA, but embodiments according to the present disclosure are not limited thereto.

The display device 1 may further include the optical element OPS including a light receiving portion. Examples of the optical element OPS including the light receiving portion may include a camera, a lens (a condenser lens or an optical path guide lens), and an optical sensor such as an infrared sensor, an iris recognition sensor and an illuminance sensor. The optical element OPS may be arranged to overlap the hole area HLA on the other surface side of the display panel 20. The light receiving portion of the optical element OPS may be partly or entirely located in the optical hole HLE_OP. Light outside the display device 1 may pass through the window substrate 401 surrounded by the print layer 402 and may be incident on the light receiving portion through the through hole HLE_TH below the window substrate 401. As described above, when the window substrate 401 exhibits high transmittance, external light may reach the light receiving portion of the optical element OPS through the optical path without large loss.

The optical element OPS may be located in the through hole HLE_TH and relatively biased toward the folding line FDA. When the display device 1 is folded, the inner wall of the through hole HLE_TH is pulled toward the folding line FDA. When each stacked member is pulled differently toward the folding line FDA, the inner wall of the through hole HLE_TH is inclined with respect to the thickness direction (third direction). When the inner wall of the through hole HLE_TH is inclined, an optical shadow in the thickness direction may be generated by a reversely inclined portion. In the case of the display device 1 which is out-folded, because the layers located on the upper side are pulled more toward the folding line FDA, the farther from the folding line FDA in the through hole HLE_TH, the greater the possibility of being covered by the shadow. In consideration of these margins, the optical element OPS may be arranged to be biased toward the folding line FDA in the unfolded state, thereby minimizing the possibility of being covered by the reversely inclined sidewall of the hole HLE even in the out-folded state.

In the unfolded state of the display device 1, the inner wall of the through hole HLE_TH is aligned in the thickness direction as shown in FIG. 6, so that most of the light transmitted through the optical hole HLE_OP can reach the light receiving portion of the optical element OPS. On the other hand, when the display device 1 is out-folded, the stacked members of the stacked structure 50 are pulled toward the folding line FDA direction as shown in FIG. 7. As the stacked members are pulled to different extents, the inner wall of the through hole HLE_TH may have an inclined surface. That is, when the display device 1 is out-folded, the largest tensile stress is applied to the window member 40 located at the uppermost position in the thickness direction, and the window member 40 may be pulled most toward the folding line FDA. The cushion layer 12, which is a relatively lower layer, receives the smallest tensile stress and may be pulled least toward the folding line FDA. As described above, the metal plate 11 may be separated by the folding line FDA. In this case, even if the display device 1 is folded, the minimum tensile stress may be applied to the metal plate 11. Because the tensile stress is exerted differently along the thickness direction, the inner wall of the through hole HLE_TH may be inclined with respect to the thickness direction.

In FIG. 7, when the stacked members are physically coupled to each other by the coupling member, the surfaces of both the stacked members physically in contact with each other with the coupling member interposed therebetween may be fixed to each other regardless of whether the display device 1 is folded or not. However, in each of the stacked members, as the display device 1 is folded, the distances by which the upper and lower portions of the corresponding layer are moved toward the folding line FDA may be different. Therefore, the surfaces of the stacked members extending in the thickness direction (third direction), i.e., the surfaces forming the inner wall of the through hole HLE_TH in the unfolded state of the display device 1, may have an inclined linear or curved shape. The surfaces of the stacked members may have a concave shape as shown in FIG. 7. However, embodiments according to the present disclosure are not limited thereto and they may have a convex shape.

The slip amount SL may be defined as a difference in distance between the upper and lower layers of the stacked members of the stacked structure 50 pulled or pushed by the folding of the display panel 20. In the illustrated example, the slip amount SL may be calculated as a distance in the first direction DR1 between the stacked member (the shock absorbing layer 30 in FIG. 7) located below the window member 40 and the metal plate 11 forming the inner wall of the through hole HLE_TH.

The slip amount SL may vary depending on the distance between the hole HLE and the folding line FDA. As the distance between the hole HLE and the folding line FDA decreases, the slip amount SL becomes larger due to larger tensile stress. As the distance between the hole HLE and the folding line FDA increases, the slip amount SL becomes smaller. Therefore, according to some example embodiments, the sling amount SL may be relatively small in order to prevent or reduce interference between the stacked member included in the display device 1 and the light receiving portion of the optical element OPS in the hole HLE and to smoothly operate the optical element OPS and the like. From this point of view, the hole HLE may be located at a position relatively far from the folding line FDA, for example, adjacent to one edge of the display device extending in the same direction as the folding line FDA.

In the folded state of the display device 1, when the stacked members pulled less toward the folding line FDA than the print layer 402 are located on the optical path, even light transmitted through the optical hole HLE_OP in a normal direction may not reach the light receiving portion of the optical element OPS. In consideration of this fact, by placing the light receiving portion of the optical element OPS in an effective optical hole HLE_OPa, the optical element OPS may operate smoothly regardless of whether the display device 1 is folded or not.

The effective optical hole HLE_OPa is a region where light in the normal direction can reach the optical element OPS regardless of whether the display device 1 is folded or not. When the slip amount SL generated by the folding of the display device 1 is the maximum amount, it may be defined as a region not overlapping the stacked members in the thickness direction in the optical hole HLE_OP. The effective optical hole HLE_OPa is included in the optical hole HLE_OP, but the effective optical hole HLE_OPa may have a width (or diameter) smaller than that of optical hole HLE_OP. The optical hole HLE_OP defined by the print layer 402 may be pulled toward the folding line FDA with respect to a lower layer (for example, the metal plate) as shown in FIG. 7 in the folded state. When the optical element OPS is biased toward the folding line FDA in the through hole HLE_TH, the light receiving portion of the optical element OPS may be located in the effective optical hole HLE_OPa even during the folding, and it can be smoothly operated regardless of the folding.

As shown in FIG. 5, the holes HLE may be located in the first unfolding area NFA1 of the display device 1 and may be located adjacent to the right side RS extending in the second direction DR2. As described above, the holes HLE may be arranged to be away from the folding line FDA in the active region AAR. As the distance from the folding line FDA increases, the slip amount SL of the hole HLE may be reduced, and thus the possibility of occurrence of defects around the hole area HLA may be reduced.

Each of distances d12, d22 and d32 between the hole HLE and the folding line FDA may be defined as the minimum distance between the through hole HLE_TH and the folding line FDA. Each of distances dh1 and dh2 between the holes HLE may be defined as a distance between the through holes HLE_TH of the two holes HLE. Each of distances d11, d21 and d31 between the hole HLE and the edge may be defined as the minimum distance between the through hole HLE_TH and the edge of the display device. The hole diameter dm may be defined as the diameter of the through hole HLE_TH.

According to some example embodiments, all of the plurality of holes HLE may be located in the active region AAR, and all of the distances d12, d22 and d32 between the respective holes HLE1, HLE2 and HLE3 and the folding line FDA may be identical. If the distances d12, d22 and d32 between the hole HLE and the folding line FDA are identical, substantially the same tensile stress is applied to each of the holes HLE, thereby facilitating placement of the light receiving portion of the optical element OPS, control of the slip amount SL, and the like.

In some embodiments, the arrangement direction of the plurality of holes HLE may be substantially the same as the extending direction of the folding line FDA. When the folding line FDA extends in the second direction DR2, the direction in which the plurality of holes HLE are arranged may be the second direction DR2 which is the same as the direction in which the folding line FDA extends. Here, the fact that the arrangement direction of the plurality of holes HLE is substantially the same as the extending direction of the folding line FDA may include not only a case where the arrangement direction thereof is completely the same as the extending direction of the folding line FDA, but also a case where the interval in the second direction DR2 is much larger than the interval in the first direction DR1 even if there is a difference in the distances d12, d22 and d32 between the holes HLE_1, HLE_2 and HLE_3 and the folding line FDA such that the holes HLE are somewhat offset in the first direction DR1. For example, when the interval of the holes HLE in the second direction DR2 is three times or more the interval of the holes HLE in the first direction DR1, it may be interpreted that the arrangement direction of the holes HLE is substantially in the second direction DR2.

If an imaginary straight line which is parallel to the folding line FDA and is close to the folding line FDA among imaginary straight lines tangent to the hole HLE is defined as a hole line LN, the hole line LN is located in the first unfolding area NFA1. If all of the distances between the plurality of holes HLE and the folding line FDA are identical, the hole line LN may be in contact with all of the plurality of holes HLE. However, embodiments according to the present disclosure are not limited thereto. According to some example embodiments, if the distances d12, d22 and d32 between the plurality of holes HLE and the folding line FDA are not identical, the hole line LN may be in contact with only one or some of the plurality of holes HLE, and all of the plurality of holes HLE may be located on one side of the hole line LN in the first direction DR1.

The distances d12, d22 and d32 between the holes HLE and the folding line FDA may be larger than the distances d11, d21 and d31 between the holes HLE and the side extending in the same direction as the extending direction of the folding line FDA. That is, the position of the hole HLE may be closer to any one of the edges extending in the extending direction of the folding line FDA than the folding line FDA. According to some example embodiments, a ratio of a straight line distance d52 from the hole line LN to the folding line FDA to a straight line distance d51 from the hole line LN to an adjacent side extending in the same direction as the extending direction of the hole line LN may be 4:1 or more, or 10:1 or more. When the ratio is satisfied, it is possible to reduce the slip amount SL by ensuring a sufficient separation distance d12, d22, d32 between the hole HLE and the folding line FDA.

Although it is illustrated in the drawings that a plurality of holes HLE are located adjacent to the right side RS in the active region AAR of the first unfolding area NFA1, the plurality of holes HLE may be located adjacent to only the left side LS or adjacent to both the right side RS and the left side LS in the active region AAR of the second unfolding area NFA2. In this case, the distance between the folding line FDA and the plurality of holes HLE may be larger than the distance between the adjacent left side LS and/or right side RS and the plurality of holes HLE.

If the folding line FDA extends in the first direction DR1, the plurality of holes HLE may be located adjacent to the upper side US and/or the lower side BS extending in the first direction DR1 in the active region AAR. In this case, the distance between the folding line FDA and the plurality of holes HLE may be larger than the separation distance between the hole HLE and the upper side RS and/or the lower side BS.

When the display device 1 includes three or more holes HLE, the distances dh1 and dh2 between the holes HLE may be equal to each other. However, they may be different from each other, or only the distances between some of the holes HLE may be equal to each other. According to some example embodiments, the distances dh1 and dh2 between the holes HLE may be 6 mm or more. When the distances dh1 and dh2 between the holes HLE are 6 mm or more, it is possible to effectively prevent or reduce instances of cracks occurring in the thin film encapsulation layer protecting the display panel 20 and the light emitting element of the display panel 20 by the stress concentrated between the holes HLE during the folding.

Figure 8:
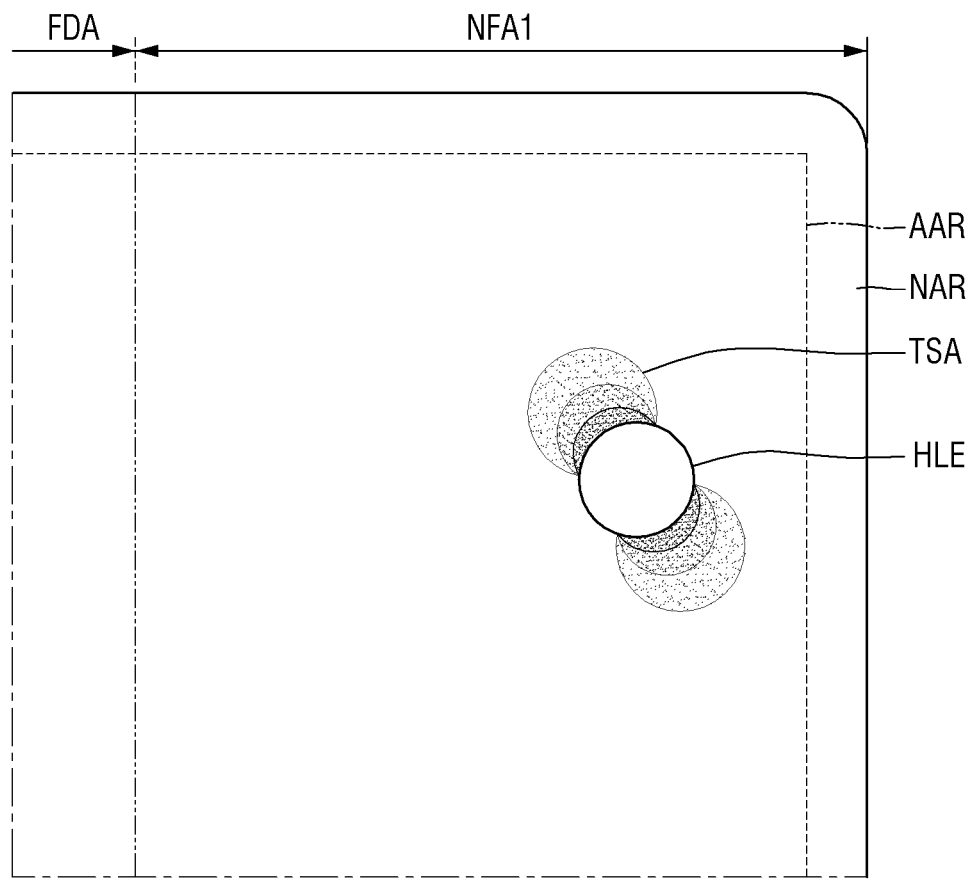
FIG. 8 is a schematic view showing tensile stress around a hole area in a state where a display device according to some example embodiments is folded.

FIG. 8 is a schematic view showing tensile stress around a hole area in a state where a display device according to an embodiment is folded.

FIG. 8 shows the stress applied to the thin film encapsulation layer around the hole HLE as the display device 1 is folded. Referring to FIG. 8, the stress applied to the thin film encapsulation layer is larger as it gets closer to the hole HLE. When the plurality of holes HLE are located adjacent to each other, the stress applied to the thin film encapsulation layer in the region between the holes HLE may be superimposed and doubled. As the distance between the holes HLE decreases, more stress may be concentrated between the holes HLE. When the distance between the holes HLE is 6 mm or more, it is possible to prevent or reduce the stresses of the adjacent holes HLE being superimposed. Therefore, it is possible to reduce the possibility of cracking of the thin film encapsulation layer due to stress concentration.

Figure 9:
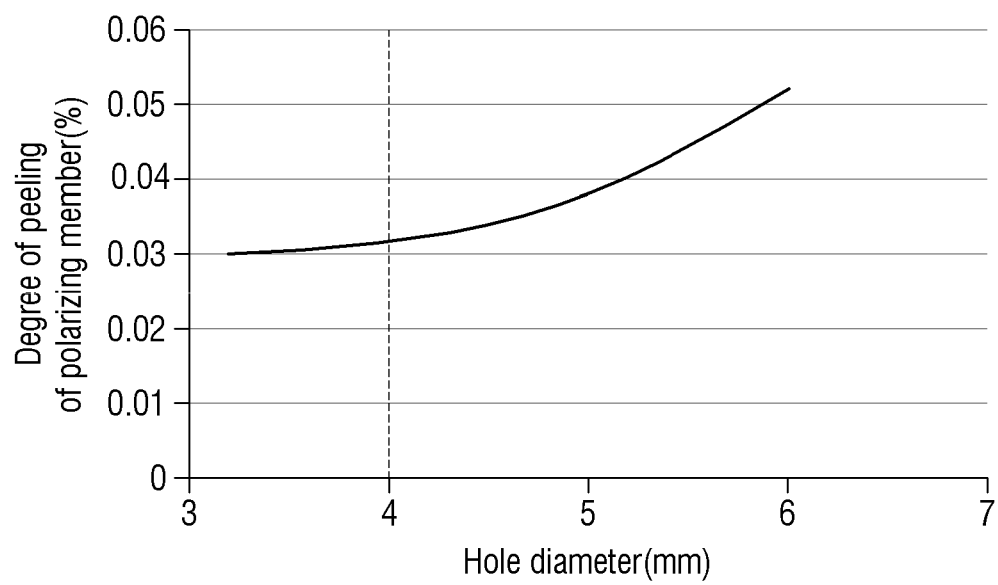
FIG. 9 is a graph showing a relationship between the hole diameter and the degree of peeling of the polarizing member.

FIG. 9 is a graph showing a relationship between the hole diameter and the degree of peeling of the polarizing member.

Referring to FIG. 9, as the hole diameter dm decreases, the risk of peeling of the polarizing member POL may be reduced. When the hole diameter dm is 4 mm or less, as the hole diameter dm decreases, a significant difference in the risk of peeling of the polarizing member POL may not occur.

Referring to FIG. 5, from the above viewpoint, the hole diameter dm may be 4 mm or less, though not limited thereto. The diameters dm1, dm2 and dm3 of the plurality of holes HLE may be identical, but embodiments according to the present disclosure are not limited thereto. According to some example embodiments, the distances d11, d21 and d31 between the holes HLE and the sides adjacent to the holes HLE may be less than or equal to 10 mm. A ratio of the hole diameter dm to the distance between the hole HLE and the right side RS may be 1:2 or less.

Hereinafter, the structure of the display panel of the display device will be described in detail.

Figure 10:
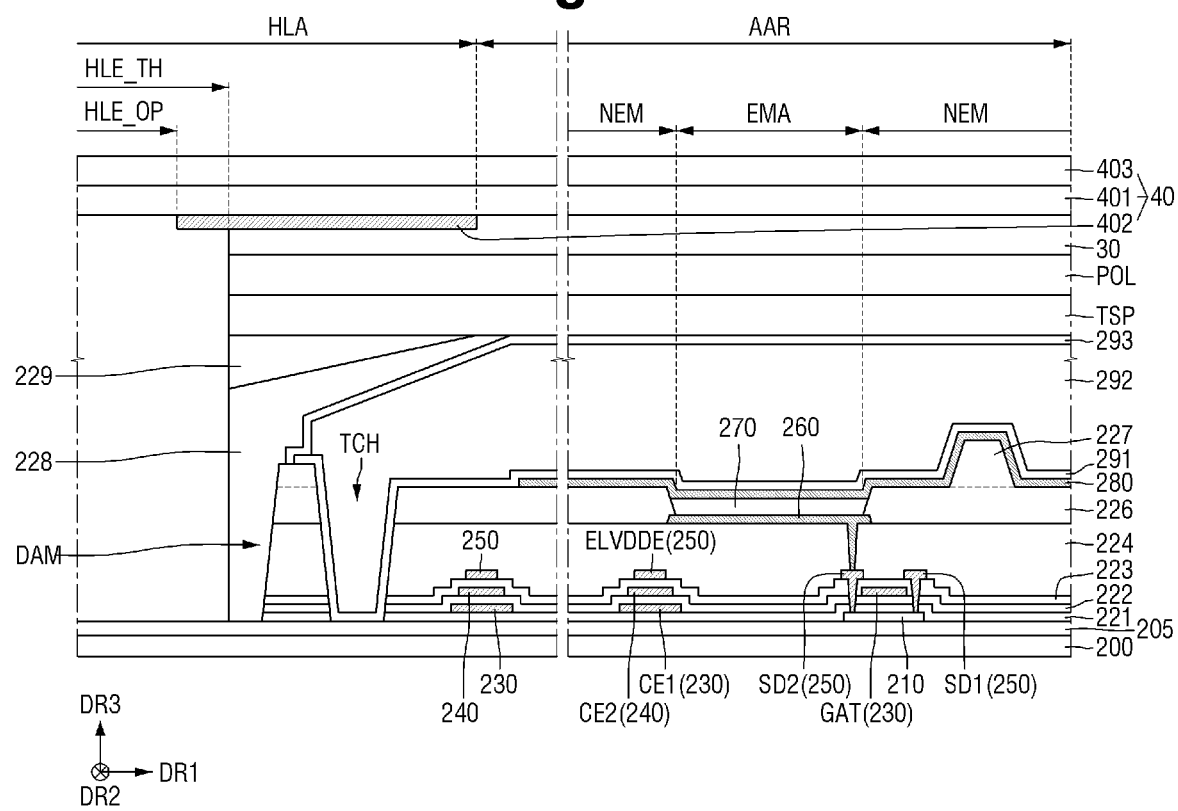
FIG. 10 is a cross-sectional view showing a periphery of a hole area and one pixel of a display device according to some example embodiments.

FIG. 10 is a cross-sectional view showing a periphery of a hole area and one pixel of a display device according to some example embodiments.

Referring to FIG. 10, the display panel 20 of the display device 1 may include substrate 200, a buffer layer 205, a semiconductor layer 210, a first insulating layer 221, a first gate conductive layer 230, a second insulating layer 222, a second gate conductive layer 240, a third insulating layer 223, a data conductive layer 250, a fourth insulating layer 224, an anode electrode 260, a bank layer 226 including an opening to expose the anode electrode 260, a light emitting layer 270 located in the opening of the bank layer 226, a cathode electrode 280 located on the light emitting layer 270 and the bank layer 226, and a thin film encapsulation layer 290 located on the casted electrode 280. Each of the layers described above may consist of a single layer, or a stack of multiple layers. Other layers may be further located between the layers.

The substrate 200 may support the respective layers located thereon. The substrate 200 may be made of an insulating material such as a polymer resin or an inorganic material such as glass or quartz.

The buffer layer 205 is located on the substrate 200. The buffer layer 205 may include silicon nitride, silicon oxide, or silicon oxynitride.

The semiconductor layer 210 is located on the buffer layer 205. The semiconductor layer 210 forms a channel of a thin film transistor of the pixel PX.

The first insulating layer 221 is located on the semiconductor layer 210. The first insulating layer 221 may be a gate insulating layer having a gate insulating function.

The first gate conductive layer 230 is located d on the first insulating layer 221. The first gate conductive layer 230 may include a gate electrode GAT of the thin film transistor of the pixel PX and a scan line connected thereto and a first electrode CE1 of a storage capacitor.

The second insulating layer 222 may be located on the first gate conductive layer 230. The second insulating layer 222 may be an interlayer insulating layer or a second gate insulating layer.

The second gate conductive layer 240 is located on the second insulating layer 222. The second gate conductive layer 240 may include a second electrode CE2 of the storage capacitor.

The third insulating layer 223 is located on the second gate conductive layer 240. The third insulating layer 223 may be an interlayer insulating layer.

The data conductive layer 250 is located on the third insulating layer 223. The data conductive layer 250 may include a first electrode SD1 and a second electrode SD2 of the thin film transistor of the pixel PX. The first electrode SD1 and the second electrode SD2 of the thin film transistor may be electrically connected to a source region and a drain region of the semiconductor layer 210 via contact holes HLE passing through the third insulating layer 223, the second insulating layer 222 and the first insulating layer 221.

The fourth insulating layer 224 is located on the data conductive layer 250. The fourth insulating layer 224 covers the data conductive layer 250. The fourth insulating layer 224 may be a via layer.

The anode electrode 260 is located on the fourth insulating layer 224. The anode electrode 260 may be a pixel electrode provided for each pixel PX. The anode electrode 260 may be connected to the second electrode SD2 of the thin film transistor via the contact hole HLE passing through the fourth insulating layer 224. The anode electrode 260 may at least partially overlap an emission region EMA of the pixel PX.

The anode electrode 260 may have a stacked structure formed by stacking a material layer having a high work function, such as indium tin oxide (ITO), indium zinc oxide (IZO), zinc oxide (ZnO) and indium oxide (In2O3), and a reflective material layer such as silver (Ag), magnesium (Mg), aluminum (Al), platinum (Pt), lead (Pb), gold (Au), nickel (Ni), neodymium (Nd), iridium (Ir), chromium (Cr), lithium (Li), calcium (Ca), or a mixture thereof, but is not limited thereto. The layer having a high work function may be located above the reflective material layer and located closer to the light emitting layer 270. The anode electrode 260 may have a multilayer structure such as ITO/Mg, ITO/MgF, ITO/Ag and ITO/Ag/ITO, but is not limited thereto.

The bank layer 226 may be located on the anode electrode 260. The bank layer 226 is located on the anode electrode 270 and may include an opening exposing the anode electrode 270. The emission region EMA and the non-emission region NEM may be distinguished by the bank layer 226 and the opening thereof.

A spacer 227 may be located on the bank layer 226. The spacer 227 may serve to maintain a gap with a structure located thereabove.

The light emitting layer 270 is located on the anode electrode 270 exposed by the bank layer 226. The light emitting layer 270 may include an organic material layer. The organic material layer of the light emitting layer may include an organic light emitting layer, and may further include a hole injecting/transporting layer and/or an electron injecting/transporting layer.

The cathode electrode 280 may be located on the light emitting layer 270. The cathode electrode 280 may be a common electrode arranged entirely without distinction of pixels PX. Each of the anode electrode 260, the light emitting layer 270 and the cathode 280 may constitute an organic light emitting element.

The cathode electrode 280 may include a material layer having a low work function, such as Li, Ca, LiF/Ca, LiF/Al, Al, Mg, Ag, Pt, Pd, Ni, Au Nd, Ir, Cr, BaF, Ba or a compound or mixture thereof (e.g., a mixture of Ag and Mg). The cathode electrode 280 may further include a transparent metal oxide layer located on the material layer having a low work function.

The thin film encapsulation layer 290 including a first inorganic film 291, a first organic film 292 and a second inorganic film 293 is located on the cathode electrode 280. The first inorganic film 291 and the second inorganic film 293 may be in contact with each other at an end portion of the thin film encapsulation layer 290. The first organic film 292 may be encapsulated by the first inorganic film 291 and the second inorganic film 293.

Each of the first inorganic film 291 and the second inorganic film 293 may include silicon nitride, silicon oxide, silicon oxynitride, or the like. The first organic film 292 may include an organic insulating material.

The display panel 20 may further include a touch layer TSP located on the thin film encapsulation layer 290. The touch layer TSP may sense a touch input. The touch layer TSP may be provided as a separate panel or film from the display panel 20 and may be attached onto the display panel 20, but may be provided in the form of a touch layer TSP inside the display panel 20, as illustrated.

The polarizing member POL may be located on the touch layer TSP. The shock absorbing layer 30 may be located on the polarizing member POL, and the window member 40 may be located on the shock absorbing layer 30. Because the polarizing member POL and the window member 40 have been described above, some redundant description will be omitted.

A dam structure DAM may be arranged around the through hole HLE_TH. The dam structure DAM may include stacked insulating layers 205, 221, 222, 223, 224, 226 and 227. Between the dam structure DAM and the pixel PX, a groove TCH from which the insulating layers 205, 221, 222, 223, 224 and 226 and the metal layers 230, 240, 250, 260 and 280 are removed may be located except for the substrate 200. At least a portion of the thin film encapsulation layer 290 may be located in the groove TCH. For example, the first organic film 292 of the thin film encapsulation layer 290 may be located on the dam structure DAM, but may not be located on the hole area HLA beyond the dam structure DAM. That is, the first organic film 292 can be prevented from overflowing into the hole area HLA through the dam structure DAM. The first inorganic film 291 or the second inorganic film 293 of the thin film encapsulation layer 290 may be further located beyond the dam structure DAM. Although it is illustrated that the first inorganic film 291 and the second inorganic film 293 terminate on the dam structure DAM before the through hole HLE_TH without being opened at the through hole HLE_TH, the embodiments according to the present disclosure are not limited thereto.

The hole area HLA may overlap the dam structure DAM in the thickness direction (third direction) of the display device 1, and may not overlap the pixel PX. Accordingly, video and images may not be displayed on the hole area HLA. However, embodiments according to the present disclosure are not limited thereto. Even if it partially overlaps the pixel PX, light emitted from the pixel PX is blocked by the printing layer 402 such that video and images cannot be displayed externally, and thus, it may be the non-active region NAR.

The thin film encapsulation layer 290 may be inclined downward toward the through hole HLE_TH in the vicinity of the through hole HLE_TH. At least one organic film 228, 229 may be further located on the thin film encapsulation layer 290 to planarize the inclined surface around the through hole HLE_TH. For example, the second organic film 228 may be located on the first organic film 292, and the third organic film 229 may be located on the second organic film 228. The second organic film 228 and the third organic film 229 may function to fill an inclined portion around the through hole HLE_TH for planarization. According to some example embodiments, the second organic film 228 and the third organic film 229 may be exposed on the side of the through hole HLE_TH to form the inner wall of the through hole HLE_TH. Accordingly, the inner wall of the through hole HLE_TH may be formed to include the respective side surfaces of the substrate 200, the buffer layer 205, the second organic film 228, the third organic film 229, the touch layer TSP, the polarizing member POL and the shock absorbing layer 30.

The above-mentioned side surfaces may be aligned in the thickness direction (third direction) to form the inner wall of the through hole HLE_TH. In the cross-sectional view, the through hole HLE_TH may include inner walls on one side and on the other side in the first direction DR1. Although only the inner wall of the through hole HLE_TH located on one side in the first direction DR1 is shown in FIG. 10, the remaining inner wall of the through hole HLE_TH may be located on the other side in the first direction DR1 of the figure and the structure of the display panel 20 and the stacked structure shown in FIG. 10 may exist symmetrically.

Hereinafter, a display device according to other embodiments will be described. In the following embodiments, some description of the same components as those of the above-described embodiments may be omitted or simplified, and differences will be mainly described.

Figure 11:
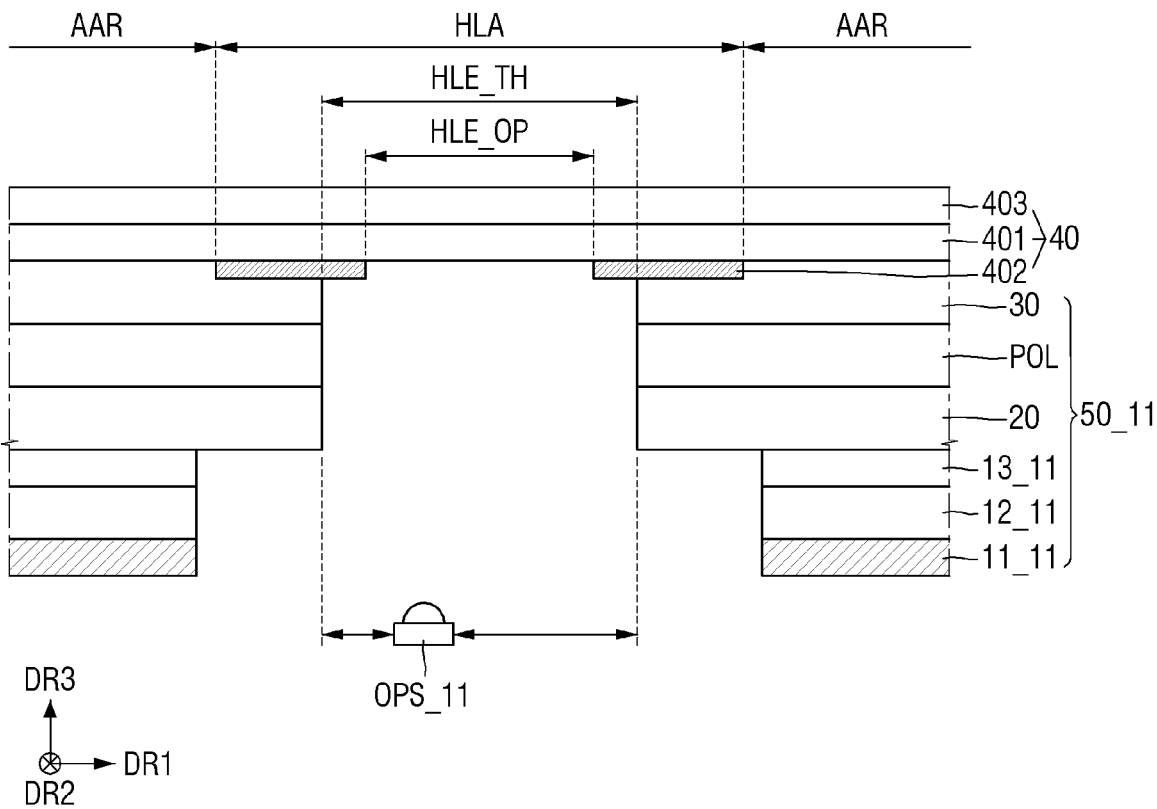
FIGS. 11 to 13 are cross-sectional views showing a periphery of a hole area of a display device according to some example embodiments.
Figure 12:
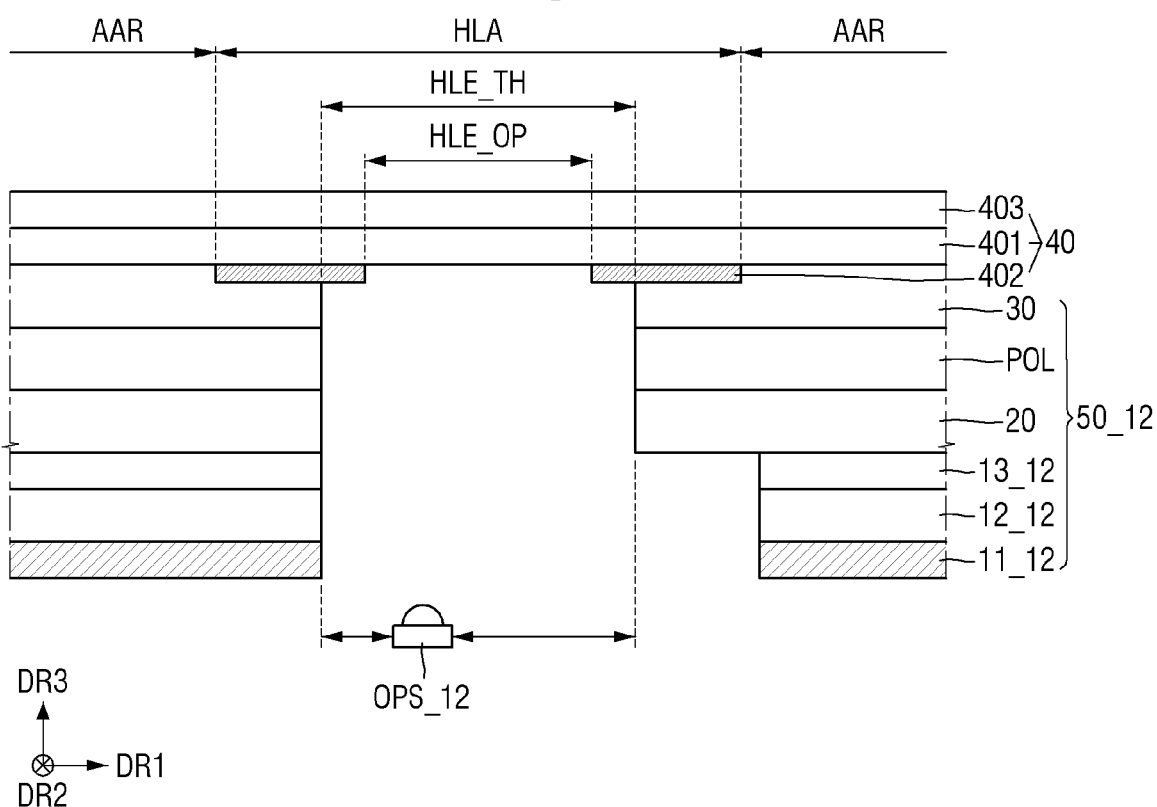
Figure 13:
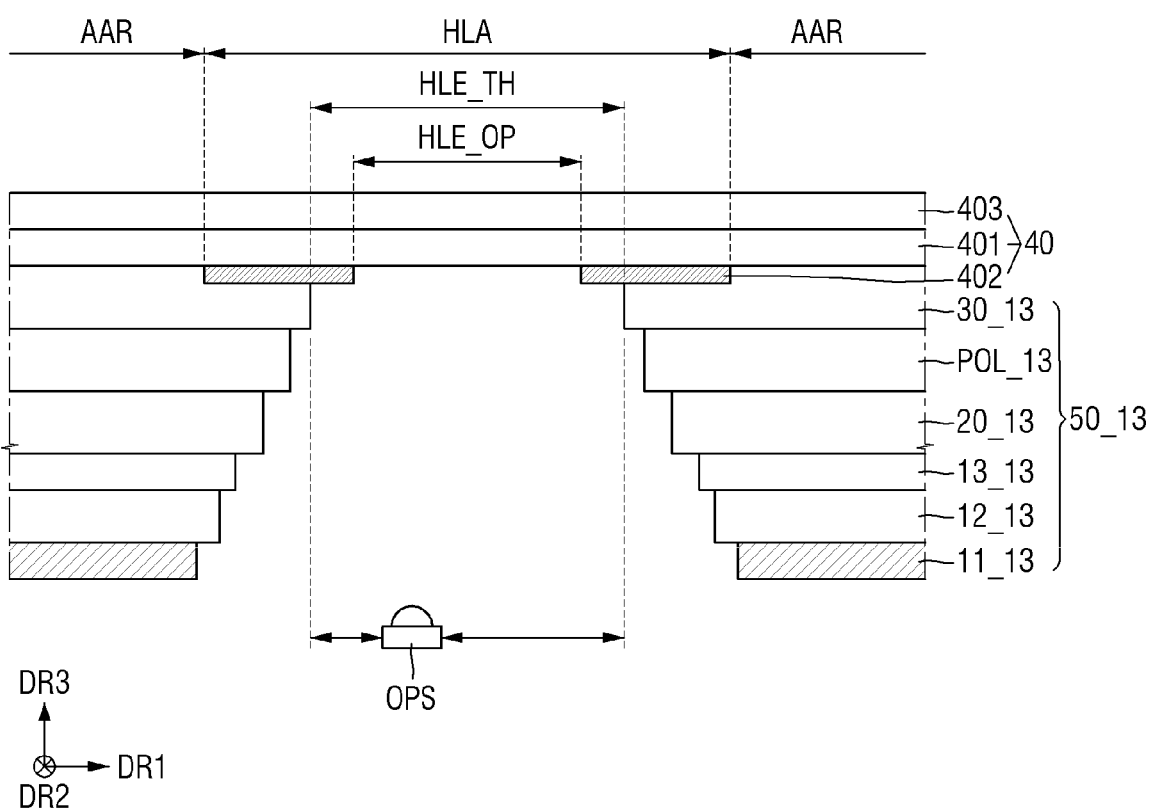

FIGS. 11 to 13 are cross-sectional views showing a periphery of a hole area of a display device according to other embodiments. FIGS. 11 to 13 illustrate that the inner wall of the through hole may not be aligned in the periphery of the hole area.

FIG. 11 illustrates that the inner wall of the through hole HLE_TH may have a stepped shape such that only some of stacked members of a stacked structure 50_11 are aligned in the thickness direction (third direction). That is, some of the stacked members constituting the inner wall of the through hole HLE_TH may be aligned with each other in the thickness direction, and the other stacked members may be aligned with each other, but the inner walls of some stacked members and the other stacked members may not be aligned with each other in the thickness direction. For example, as shown in FIG. 11, the inner wall of the through hole HLE_TH on the side of a metal plate 11_11, a cushion layer 12_11 and a polymer film layer 13_11 may be aligned in the thickness direction (third direction), and may be located more outward than the inner wall of the through hole HLE_TH on the side of the display panel 20, the polarizing member POL and the shock absorbing layer 30. Contrary to the illustrated example, the inner wall of the through hole HLE_TH on the side of the aligned stacked members 11_11, 12_11 and 13_11 may be located more inward than the inner wall of the through hole HLE_TH on the side of the display panel 20, the polarizing member POL and the shock absorbing layer 30. Further, although it is illustrated in FIG. 11 that the inner wall of the through hole HLE_TH on the side of the stacked members which are located consecutively in the thickness direction (third direction) is aligned, the embodiments according to the present disclosure are not limited thereto. The inner wall of the through hole HLE_TH may be aligned in the thickness direction (third direction) between some of the stacked members which are not located consecutively in the thickness direction (third direction).

Referring to FIG. 11, when a display device 1_11 is folded, the stacked members included in the display device 1_11 may be pulled toward the folding line FDA. As described above, an optical element OPS_11 may be located in the through hole HLE_TH to be biased toward the folding line FDA. Accordingly, as described above, the optical element OPS_11 can be smoothly operated regardless of whether the display device 1_11 is folded or not. However, unlike the case of FIG. 6, the position of the inner wall of the through hole HLE_TH in the first direction in FIG. 11 may be different for each of the stacked members. The optical element OPS_11 may be located inward in the first direction DR1 from the stacked member located at the innermost position of the through hole HLE_TH among all the stacked members forming the inner wall of the through hole HLE_TH.

FIG. 12 illustrates that one of two inner walls of the through hole HLE_TH in cross-sectional view may have all of the stacked members aligned, but the stacked members forming the other inner wall may not be aligned. Unlike the case of FIG. 6, one of two inner walls of the through hole HLE_TH in cross-sectional view may be aligned and the other inner wall of the through hole HLE_TH may be formed such that only some stacked members 11_12, 12_12 and 13_12 are aligned in the thickness direction. The alignment of the inner wall of the through hole on the side of the some stacked members 11_12, 12_12 and 13_12 and the position of an optical element OPS_12 have been described above, and thus a description thereof is omitted.

FIG. 13 illustrates that all stacked members may not be aligned on the inner wall of the through hole HLE_TH. The embodiment of FIG. 13 is different from the embodiments of FIGS. 11 and 12 in that the inner wall of the through hole HLE_TH of each of stacked members 11_13, 12_13, 13_13, 20_13, POL_13 and 30_13 is not aligned with the inner wall of the through hole HLE_TH of all other stacked members in the thickness direction (third direction). The inner wall of the through hole HLE_TH of each stacked member may include a different width extending in the first direction DR1.

The position of an optical element OPS_13 has been described above, and thus a redundant description is omitted.

In each of the embodiments of FIGS. 11 to 13, the diameter of the through hole HLE_TH may be 4 mm or less. However, the embodiments according to the present disclosure are not limited thereto, and some or all of the embodiments may have the diameter of the through hole, which is 4 mm or more. When the inner wall of the through hole HLE_TH of the stacked members is not aligned, the hole diameter dm is defined as the diameter of the through hole HLE_TH of the display panel 20, and at least the diameter of the through hole HLE_TH of the display panel 20 may be 4 mm or less.

Figure 14:
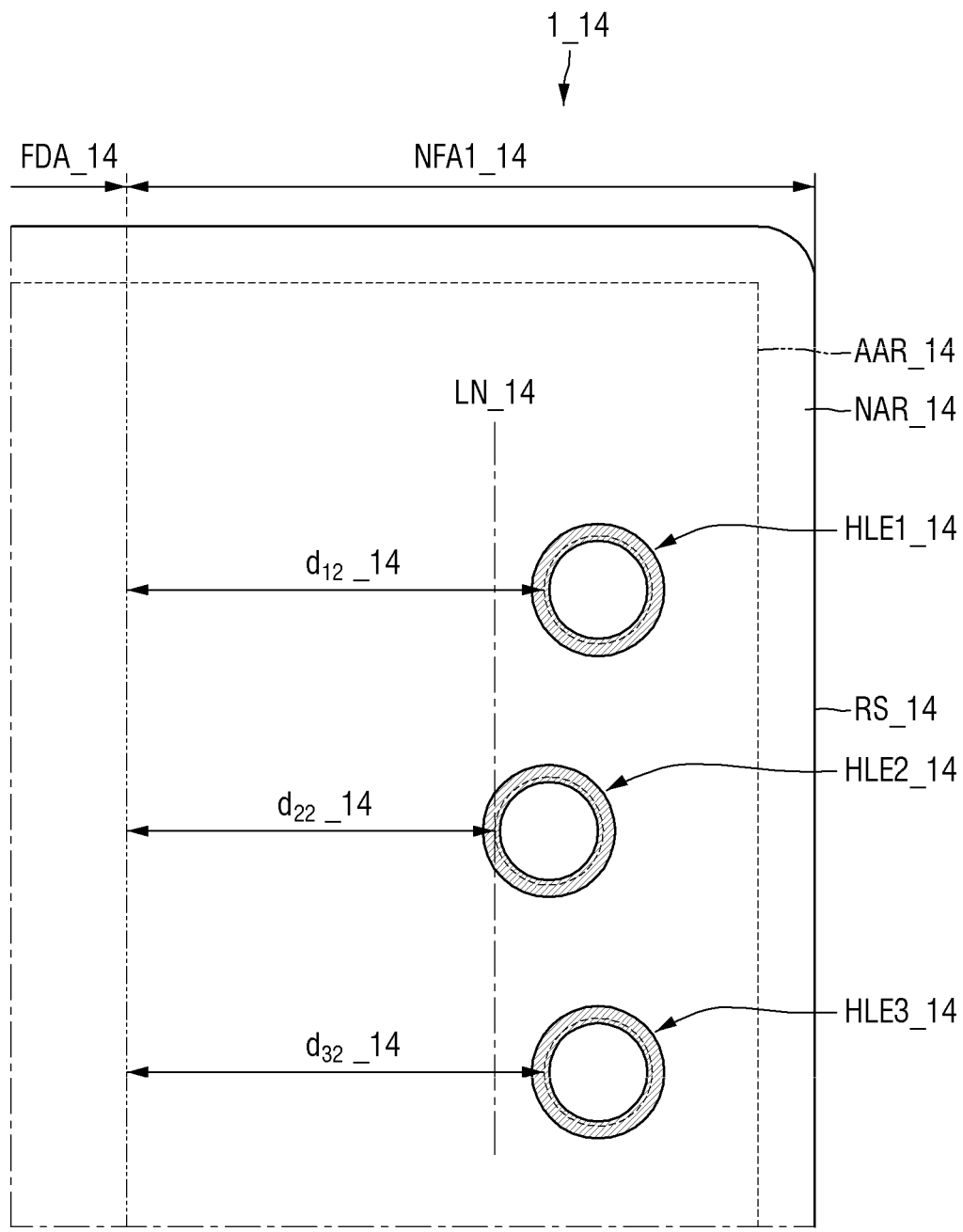
FIGS. 14 to 16 are layout diagrams showing a planar arrangement relationship between members around a hole area according to some example embodiments.
Figure 15:
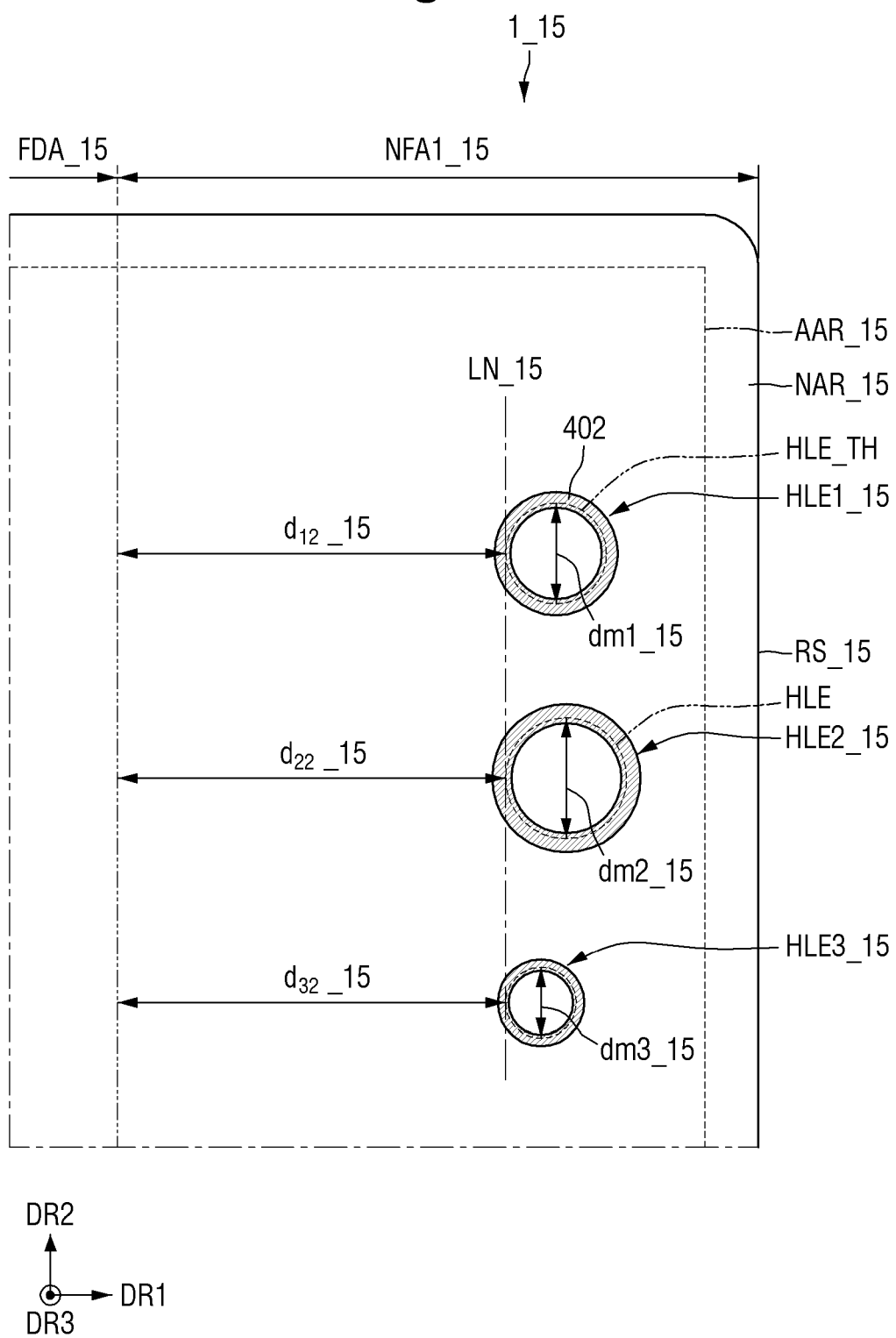
Figure 16:
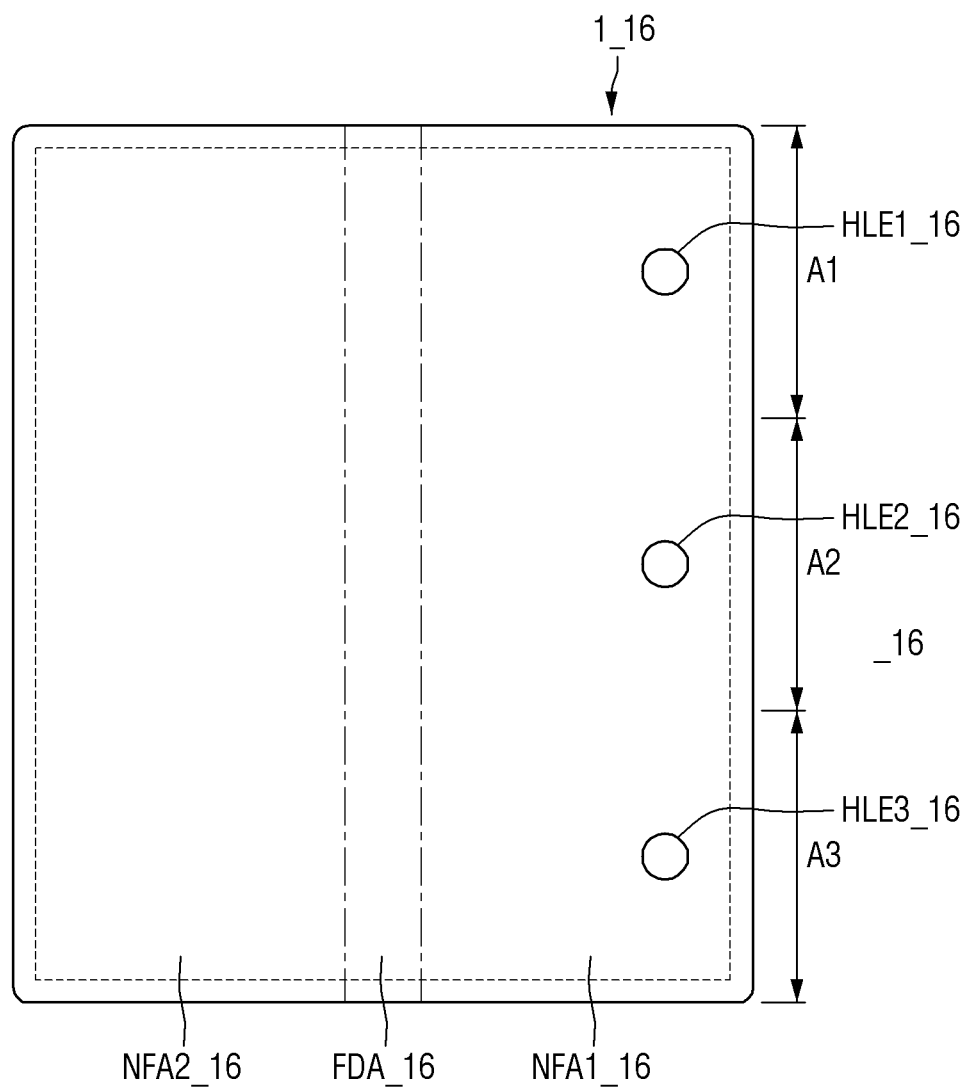

FIGS. 14 to 16 are layout diagrams showing a planar arrangement relationship between members around a hole area according to other embodiments. FIGS. 14 to 16 illustrate that the arrangement of the holes and the hole diameter may be variously modified.

FIG. 14 illustrates that a plurality of holes HLE1_14, HLE2_14 and HLE3_14 are located adjacent to a right side RS_14, and distances from the folding line FDA_14 to the holes HLE1_14, HLE2_14 and HLE3_14 may be entirely different or only partly identical. That is, unlike the case of FIG. 5, only some of the plurality of holes HLE1_14, HLE2_14 and HLE3_14 may be in contact with the hole line LN, and the remaining holes may not be in contact with the hole line LN. Further, all of the plurality of holes HLE1_14, HLE2_14 and HLE3_14 may be located on one side of the hole line LN in the first direction DR1. Thus, the arrangement direction of the plurality of holes HLE1_14, HLE2_14 and HLE3_14 may not be completely the same as the extending direction of the folding line FDA. Also in this case, the interval of the plurality of holes HLE1_14, HLE2_14 and HLE3_14 in the second direction DR2 may be three times or more the interval thereof in the first direction DR1.

FIG. 15 illustrates that a plurality of holes HLE_15 are located adjacent to a right side RS_15 in an active region AAR_15 and all distances from a folding line FDA_15 to holes HLE1_15, HLE2_15 and HLE3_15 are identical, but all diameters of the holes may not be identical. That is, unlike the case of FIG. 5, only some of the plurality of holes HLE1_15, HLE2_15 and HLE3_15 may have the same diameter, or all of them may have different diameters. As described above, diameters dm1_15, dm2_15 and dm3_15 of the plurality of holes HLE1_15, HLE2_15 and HLE3_15 may all be 4 mm or less. However, the embodiments according to the present disclosure are not limited thereto, and some of the plurality of holes HLE1_15, HLE2_15 and HLE3_15 may not have a diameter of 4 mm or less.

FIG. 16 illustrates that a display device 1_16 includes a plurality of holes HLE_16 in the active region, and the plurality of holes may be located at predetermined distances in the second direction DR2. That is, referring to FIG. 16, a plurality of holes HLE1_16, HLE2_16 and HLE3_16 are located adjacent to a right side RS_16 in a first unfolding area NFA_16, and may be located at the same distance from a folding line FDA_16. However, unlike the case of FIG. 5, some or all of the holes HLE1_16, HLE2_16 and HLE3_16 may not be adjacent to each other and may be spaced apart from each other by a predetermined distance in the same direction as the extending direction of the folding line FDA_16. For example, when the display device 1_16 is divided into three equal parts in the second direction DR2, each having the same width extending in the second direction DR2, the plurality of holes HLE may be located in a first area A1, a second area A2 and/or a third area A3. However, according to some example embodiments, the display device 1_16 may be divided into two equal parts or four or more equal parts in the second direction DR2. Also in this case, because the plurality of holes HLE are located adjacent to the right side RS_16, all of the holes HLE1_16, HLE2_16 and HLE3_16 may be located away from the folding line FDA_16.

Figure 17:
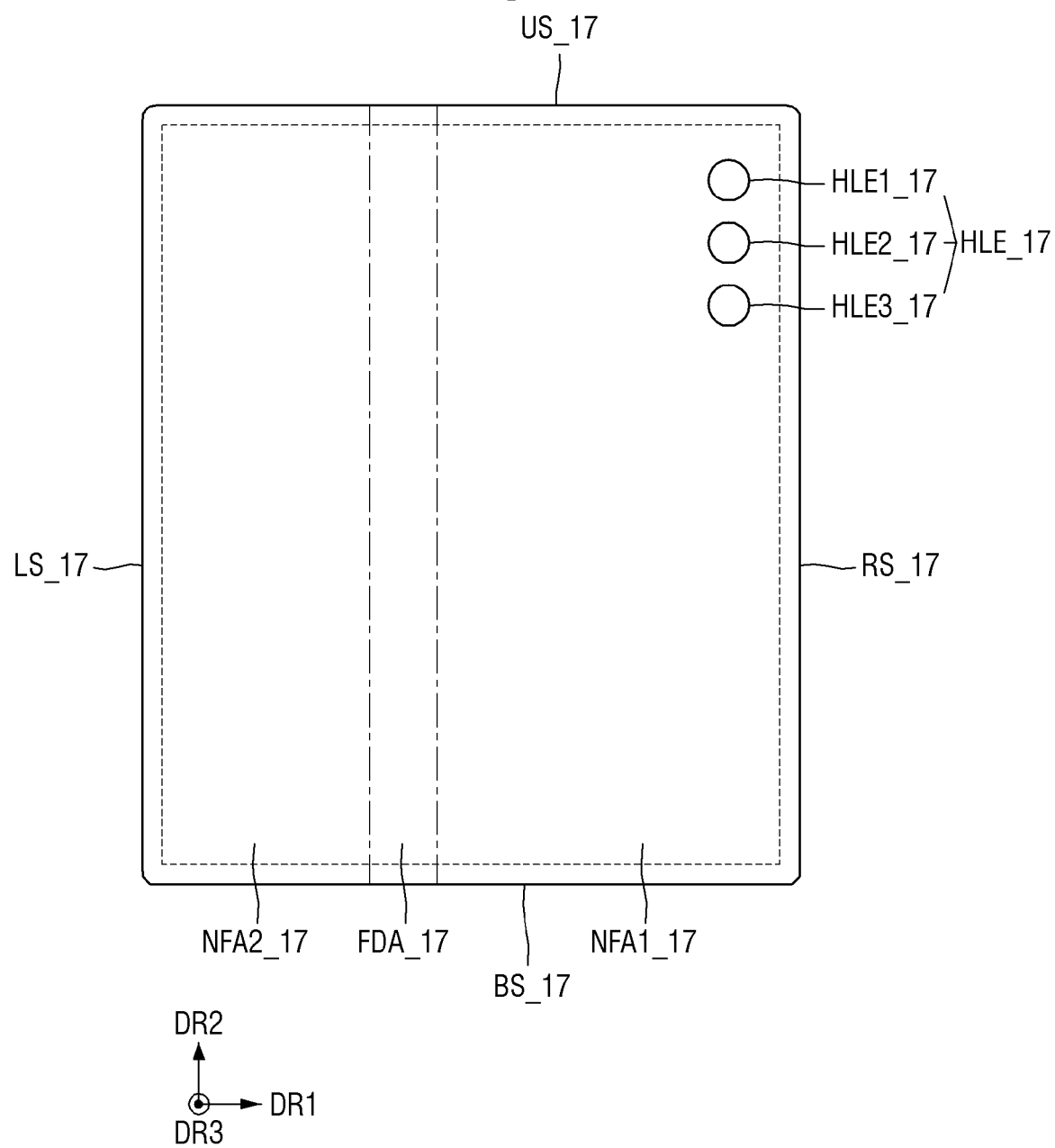
FIG. 17 is a plan view of a display device according to some example embodiments.
Figure 18:
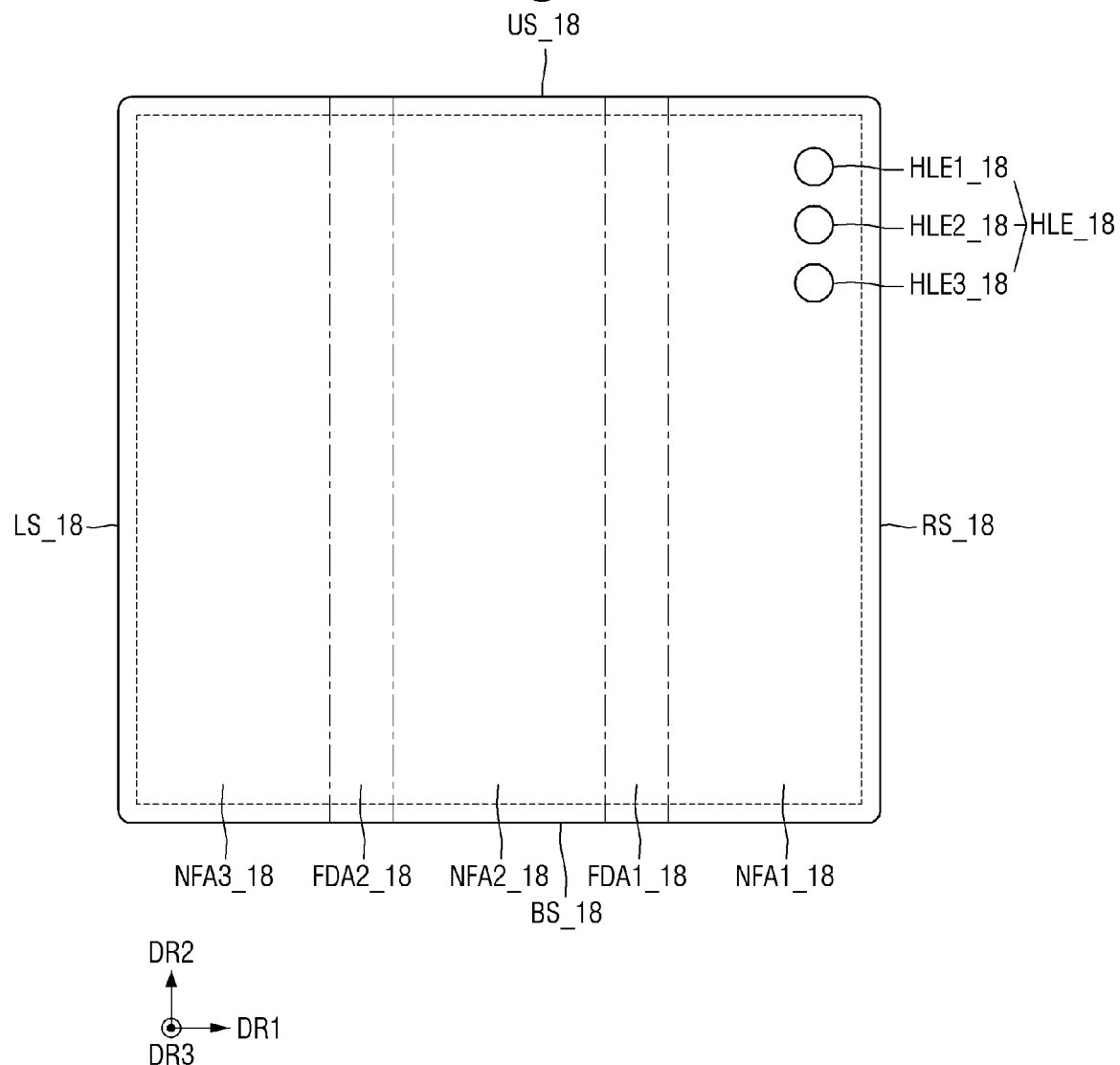
FIG. 18 is a plan view of a display device according to some example embodiments.
Figure 20:
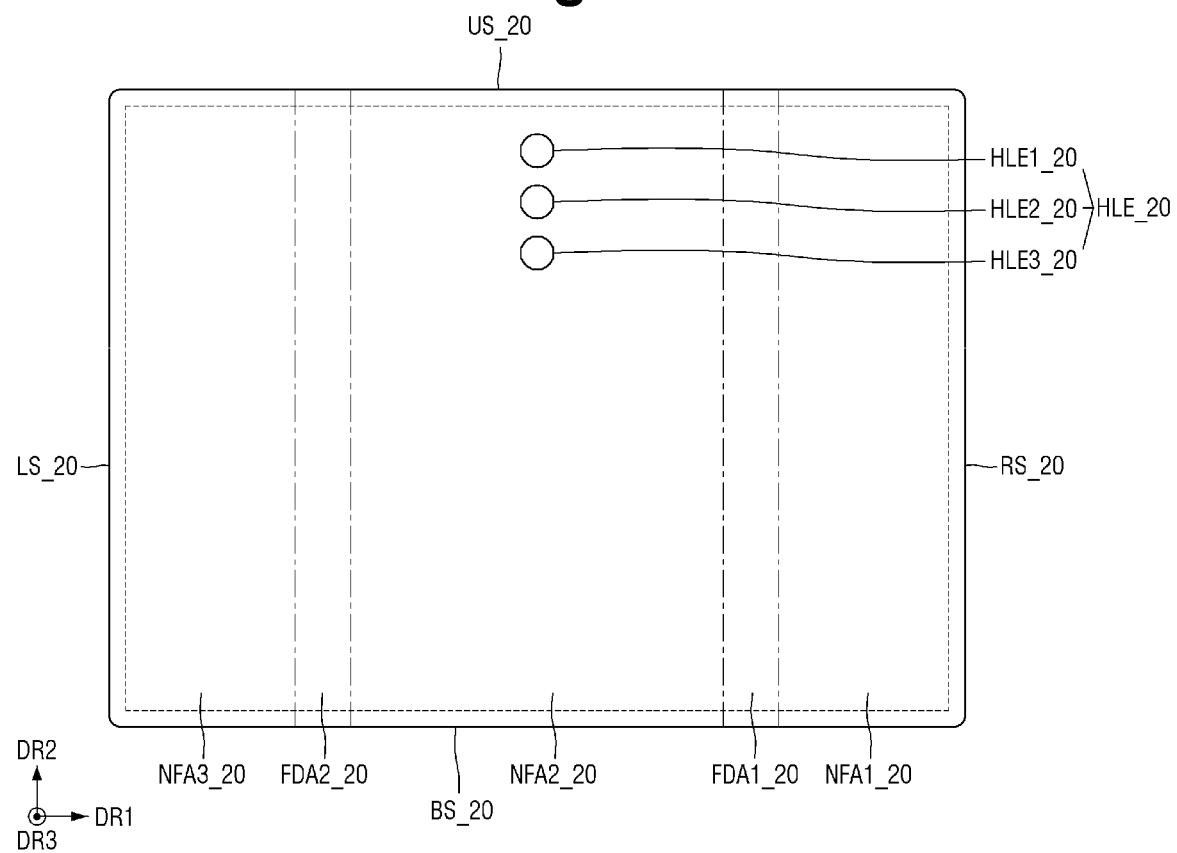
FIG. 20 is a plan view of a display device according to some example embodiments.
Figure 21:
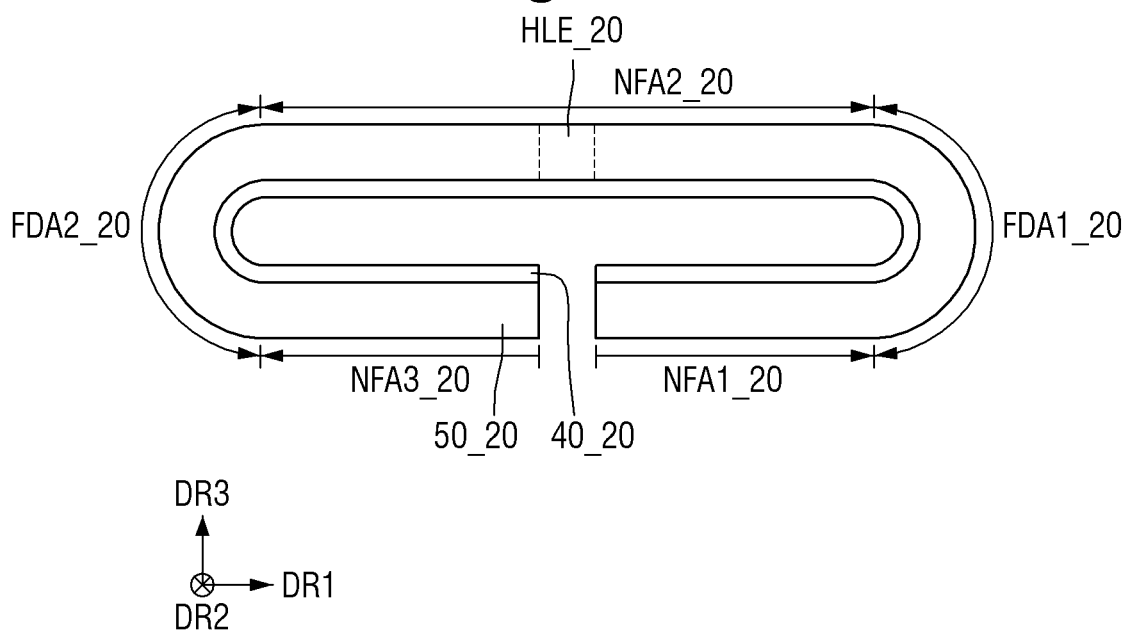
FIG. 21 is a side view showing the display device of FIG. 20 in a folded state.

FIGS. 17 to 21 illustrate that the position and the number of folding lines included in a display device may be variously changed in other embodiments. FIGS. 17, 18 and 20 are plan views of a display device according to other embodiments. FIGS. 19 and 21 are side views showing the display device of FIGS. 18 and 20 in a folded state, respectively.

FIG. 17 illustrates that the widths of a first unfolding area NFA1_17 and a second unfolding area NFA2_17 specified by a folding line FDA_17 in the first direction DR1 may be different from each other. That is, unlike the case of FIG. 1, a folding line FDA_17 extending in the second direction DR2 may not be located exactly in the center of a display device 1_17 in the first direction DR1, and may be located to be biased toward any one of sides RS_17 and LS_17 extending in the second direction DR2. Thus, in other embodiments, the widths of the first unfolding area NFA1_17 and the second unfolding area NFA2_17 specified by the folding line FDA_17 in the first direction DR1 may not be identical, and the first unfolding area NFA1_17 and the second unfolding area NFA2_17 specified by the folding line FDA_17 may have different widths extending in the first direction DR1. As described above, as the distance between a hole HLE_17 and the folding line FDA_17 increases, the slip amount SL may be reduced and the tensile stress applied to the thin film encapsulation layer 290 may also be reduced. Referring to FIG. 17, because the folding line FDA_17 is located adjacent to the left side LS_17 rather than the right side RS_17, the width of the first unfolding area NFA1_17 extending in the first direction DR1 may be greater than the width of the second unfolding area NFA2_17 extending in the second direction DR2. In this case, the hole HLE_17 or a plurality of holes HLE_17 may be located adjacent to the right side RS_17 in an active region AAR_17 of the first unfolding area NFA1_17 to be located away from the folding line FDA_17. However, the embodiments according to the present disclosure are not limited thereto, and the hole HLE_17 or the plurality of holes HLE_17 may be located adjacent to only the left side LS_17 in the second unfolding area NFA2_17. Alternatively, the hole HLE_17 or the plurality of holes HLE_17 may be located adjacent to the right side RS_17 and the left side LS_17 in the first unfolding area NFA1_17 and the second unfolding area NFA2_17.

The arrangement of holes and a folding method of a display device when the display device includes a plurality of folding lines will be described with reference to FIGS. 18 and 19.

FIGS. 18 and 19 illustrate that the display device may include a plurality of folding lines rather than one folding line. That is, unlike the embodiment of FIG. 1, the display device may include a plurality of folding lines FDA1_18 and FDA2_18. Referring to FIG. 18, when there are two folding lines FDA1_18 and FDA2_18, three unfolding areas NFA1_18, NFA2_18 and NFA3_18 may be specified by the folding lines FDA1_18 and FDA2_18, and the widths extending in the first direction DR1 may have the same length. According to some example embodiments, with regard to the two folding lines, a folding line located on one side in the first direction DR1 may be specified as a first folding line FDA1_18 and a folding line on the other side in the first direction DR1 may be specified as a second folding line FDA2_18. The first folding line FDA1_18 may specify the first unfolding area NFA1_18 and the second unfolding area NFA2_18, and the second folding line FDA2_18 may specify the second unfolding area NFA2_18 and the third unfolding area NFA3_18. The first folding line FDA1_18 and the second folding line FDA2_18 may extend in the second direction DR2. The first unfolding area NFA1_18, the second unfolding area NFA2_18 and the third unfolding area NFA3_18 may have the same width extending in the first direction DR1. In this case, the holes HLE_13 may be located adjacent to a right side RS_18 and/or a left side LS_18 in an active region AAR_18 of the first unfolding area NFA1_18 and/or the third unfolding area NFA3_18 to be located away from the folding line.

Referring to FIG. 19, the display device of FIG. 18 may be Z-folded as shown in FIG. 19. That is, the first folding line FDA1_18 may be out-folded, the second folding line FDA2_18 may be in-folded, and the second unfolding area NFA2_18 may be located between the first unfolding area NFA1_18 and the third unfolding area NFA3_18. However, the embodiments according to the present disclosure are not limited thereto. According to some example embodiments, the first folding line FDA1_18 may be in-folded, and the second folding line FDA2_18 may be out-folded. According to some example embodiments, both the first folding line FDA1_18 and the second folding line FDA2_18 may be in-folded or out-folded (G folding).

Although FIGS. 18 and 19 illustrate only a case where two folding lines are provided, the above description may also be applied to a case where three or more folding lines are provided.

FIGS. 20 and 21 illustrate that a display device includes two or more folding lines and all the widths, extending in the first direction DR1, of unfolding areas NFA1_20, NFA2_20 and NFA3_20 specified by folding lines FDA1_20 and FDA2_20 may not be identical. The embodiment of FIGS. 20 and 21 is different from the embodiment of FIGS. 18 and 19 in that the widths of the plurality of unfolding areas NFA1_20, NFA2_20 and NFA3_20 specified by the folding lines FDA1_20 and FDA2_20 may be different. In FIGS. 20 and 21, as described above, the number of the folding lines FDA1_20 and FDA2_20 may be two, and the number of the unfolding areas NFA1_20, NFA2_20 and NFA3_20 specified by the folding lines FDA1_20 and FDA2_20 may be three. However, the widths of the unfolding areas NFA1_20, NFA2_20 and NFA3_20 extending in the first direction DR1 may not be equal to each other. The sum of the lengths of the widths of the first unfolding area NFA1_20 and the third unfolding area NFA3_20 extending in the first direction DR1 may be less than or equal to the length of the width of the second unfolding area NFA2_20 extending in the first direction DR1. In this case, a plurality of holes HLE_20 may be located in an active region AAR_20 of the second unfolding area NFA2_20. However, the embodiments according to the present disclosure are not limited thereto, and the holes HLE_20 may be located adjacent to a right side RS_20 and/or a left side LS_20 in the active region AAR_20 of the first unfolding area NFA1_20 and/or the third unfolding area NFA3_20.

Referring to FIG. 21, the display device of FIG. 20 may have a folded structure as shown in FIG. 21. Referring to FIG. 21, both the first folding line FDA1_20 and the second folding line FDA2_20 may be out-folded. However, embodiments according to the present disclosure are not limited thereto, and each of the first folding line FDA1_20 and the second folding line FDA2_20 may be in-folded or out-folded. When both the first folding line FDA1_20 and the second folding line FDA2_20 are out-folded as shown in FIG. 21, the display surface located on one surface of the display device may display video and images on one side and the other side in the thickness direction. On the other hand, when both the first folding line FDA1_20 and the second folding line FDA2_20 are in-folded, a user cannot visually recognize video and images from the outside.

Figure 22:
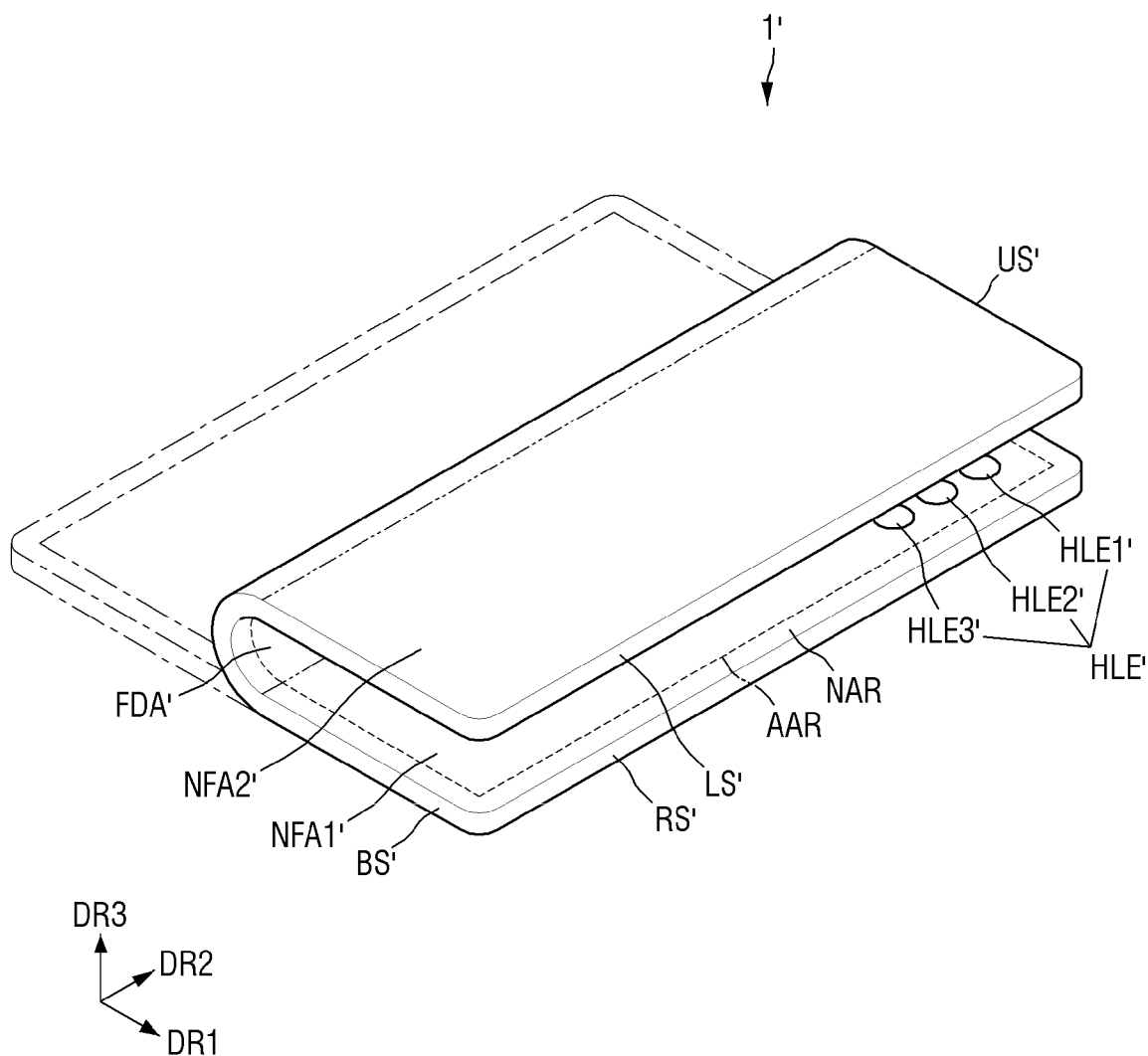
FIG. 22 is a perspective view of a display device in an in-folded state according to some example embodiments.
Figure 23:
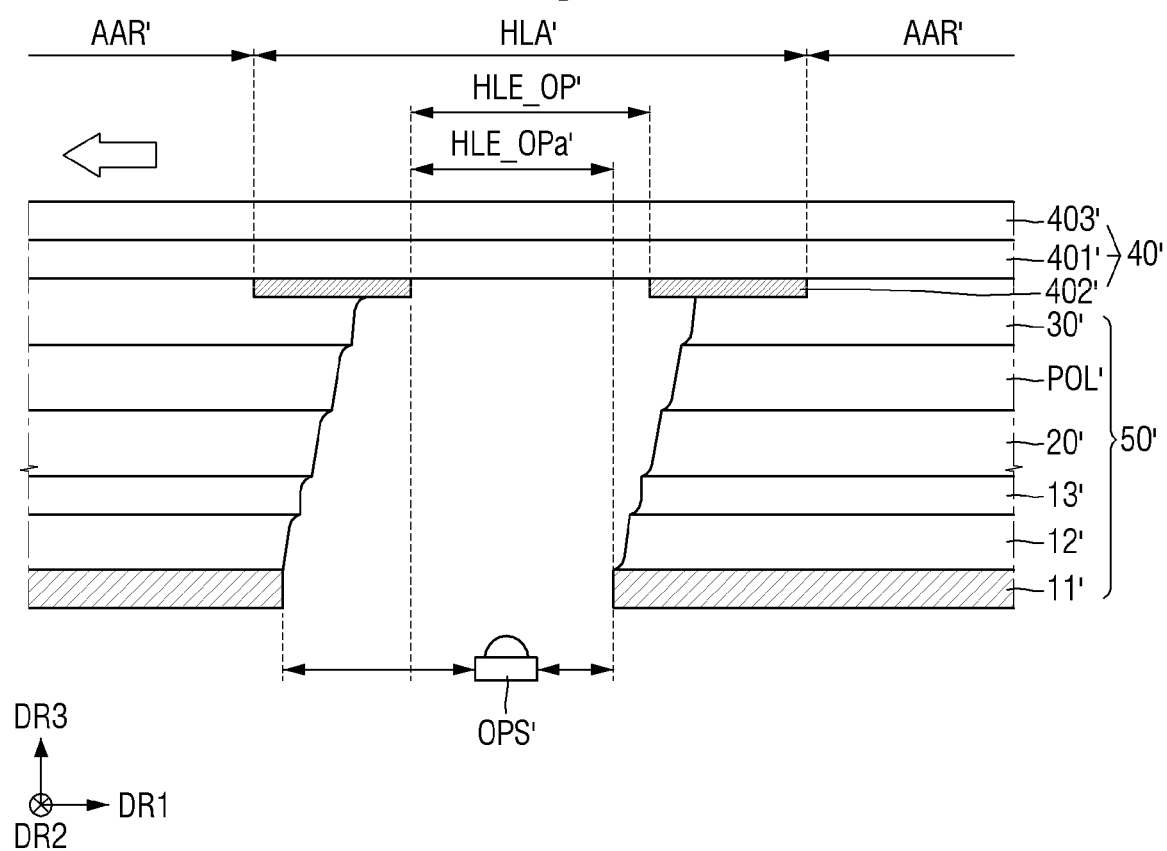
FIG. 23 is a cross-sectional view showing a periphery of a hole in the in-folded state of the display device of FIG. 22.

FIG. 22 is a perspective view of a display device in an in-folded state according to some example embodiments. FIG. 23 is a cross-sectional view showing a periphery of a hole in the in-folded state of the display device of FIG. 22. FIGS. 22 and 23 illustrate that the folding method of the display device and the arrangement of stacked members around the hole in cross-sectional view can be variously modified.

FIG. 22 illustrates that a display device 1' may be folded in an in-folding manner instead of an out-folding manner. In other words, unlike the embodiment of FIG. 2, when the display device 1' is folded, the display surface may be folded inward such that portions of the display surface face each other. The display surface located on one surface of the display device 1' may be located inside the display device 1' in a folded state of the display device 1', and thus, the user cannot visually recognize video and images from the outside. Also in this case, a structure in which a plurality of holes HLE' located in an active region AAR' of the display device 1' are located away from a folding line FDA' may be maintained.

FIG. 23 illustrates that when the display device 1' is in-folded, a larger tensile stress may be applied as it gets farther away from a window member 40' and the optical member may be biased toward one side in a first direction DR1' in a through hole HLE_TH'. That is, unlike the embodiment of FIG. 7, as the display device 1' is folded, the tensile stress applied to each stacked member may be the minimum for the window member 40', and the stacked member located away from the window member 40' in the thickness direction (third direction) may receive a large tensile stress. Thus, a metal plate 11', which receives the largest tensile stress, is pulled to the maximum extent toward the other side in the first direction DR1. Accordingly, because an optical hole HLE_OP' may be located on one side in the first direction DR1 in the through hole HLE_TH' of the metal plate 11', the optical hole HLE_OP' may be biased in a direction away from the folding line FDA' in the through hole HLE_TH'.

In concluding the detailed description, those skilled in the art will appreciate that many variations and modifications can be made to the example embodiments without substantially departing from the principles of the present invention. Therefore, the disclosed example embodiments of the invention are used in a generic and descriptive sense only and not for purposes of limitation.

What is claimed is:

1. A display device comprising:
   an active region;
   a plurality of holes at least partially surrounded by the active region;
   a folding line extending in a first direction;
   a display panel;
   a metal plate disposed below the display panel, the metal plate including a first metal plate and a second metal plate spaced apart from the first metal plate;
   an optical element at a location that overlaps a hole from among the plurality of holes in a folded position of the display device,
   wherein in a folded position, the hole includes a first side of an inner wall and a second side of the inner wall that are angled toward a same direction;
   wherein each of the holes are arranged in the first direction; and
   wherein each of the holes penetrates the display panel and the metal plate.

2. The display device of claim 1, wherein each of the holes is located at a uniform distance from the folding line.

3. The display device of claim 1, wherein the first direction is parallel to one edge of the display device.

4. The display device of claim 3, wherein a first distance between the one edge and each of the holes is smaller than a second distance between the folding line and each of the holes.

5. The display device of claim 4, wherein the first distance is 10 millimeters (mm) or less, a separation distance between the holes is 6 mm or more, and a diameter of each hole is 4.0 mm or less.

6. The display device of claim 1, further comprising:
a polarizing member on one surface of the display panel,
wherein the hole passes through the display panel and the polarizing member.

7. The display device of claim 1, further comprising:
a polymer film layer on the other surface of the display panel,
wherein the hole passes through the display panel and the polymer film layer.

8. The display device of claim 7, further comprising:
a metal plate on the other surface of the polymer film layer,
wherein the hole further passes through the metal plate.

9. The display device of claim 1, further comprising:
a plurality of hole areas at least partially surrounded by the active region,
wherein each of the plurality of hole areas includes at least one hole, and
wherein the hole areas correspond to a non-active region.

10. The display device of claim 1, further comprising:
the optical element including a light receiving portion overlapping an inside of the hole.

11. The display device of claim 10, wherein the display device includes a first unfolding area on a first side of the folding line and a second unfolding area on a second side of the folding line,
wherein the first side of the inner wall of the hole is arranged toward one edge of the first unfolding area and the second side of the inner wall of the hole is arranged toward the folding line, and
wherein a third distance between the light receiving portion and the first inner wall of the hole is larger than a fourth distance between the light receiving portion and the second inner wall of the hole.

12. The display device of claim 11, wherein the display device is configured to be out-folded with respect to the folding line.

13. The display device of claim 1, wherein in a folded state, the first side of the inner wall of the hole is inclined with respect to a thickness direction.

14. The display device of claim 1,
wherein each of the holes overlaps a virtual line extending in the first direction.

15. The display device of claim 1,
wherein the optical element is biased toward the folding line relative to a center of the hole in an unfolded state of the display device.

16. The display device of claim 1, further comprising:
a window member disposed on the display panel, the window member including a window substrate and a print layer disposed on a surface of the window substrate;
wherein the metal plate includes inner side surfaces defining each of the holes,
wherein in an unfolded state, a portion of the inner side surfaces of the metal plate and the print layer overlap each other, and
wherein in a folded state, the portion of the inner side surfaces of the metal plate and the print layer do not overlap each other.

17. A foldable display device including a display panel, a metal plate disposed below the display panel and an optical member, the foldable display device comprising:
a folding line extending in one direction;
a first unfolding area on a first side of the folding line;
a second unfolding area on a second side of the folding line;
a through hole in the first unfolding area,
wherein the through hole is inside an active region of the foldable display device,
wherein a first distance between one edge of the first unfolding area and the through hole is smaller than a second distance between the folding line and the through hole,
wherein the first distance is 10 millimeters (mm) or less,
wherein a diameter of the through hole is 4.0 mm or less, and
wherein the optical member is at a location that overlaps the through hole in a folded position of the display device,
wherein in a folded position, the through hole includes a first side of an inner wall and a second side of the inner wall that are angled toward a same direction, and
wherein the through hole penetrates the display panel and the metal plate.

18. The foldable display device of claim 17, wherein the through hole is provided plurally, and a separation distance between the plurality of through holes is 6 mm or more.

19. The foldable display device of claim 17, wherein the through hole is provided plurally, and the plurality of through holes are arranged along an extending direction of the folding line.

20. The foldable display device of claim 19, wherein the one edge of the first unfolding area extends along the extending direction of the folding line.

21. The foldable display device of claim 17, wherein in a folded state, the inner wall of the through hole is inclined with respect to a thickness direction.

22. The foldable display device of claim 17, further comprising:
the optical member including a light receiving portion overlapping an inside of the through hole.

23. The foldable display device of claim 22, wherein the first side of the inner wall of the through hole is arranged toward one edge of the first unfolding area and the second side of the inner wall of the through hole is arranged toward the folding line, and
wherein a third distance between the light receiving portion and the first inner wall of the through hole is larger than a fourth distance between the light receiving portion and the second inner wall of the through hole.

* * * * *